(12) United States Patent
Vaziri et al.

(10) Patent No.: US 11,199,691 B2
(45) Date of Patent: **\*Dec. 14, 2021**

(54) IMAGING SIGNAL EXTRACTION APPARATUS AND METHODS OF USING SAME

(71) Applicant: The Rockefeller University, New York, NY (US)

(72) Inventors: Alipasha Vaziri, Greenwich, CT (US); Tobias Noebauer, New York, NY (US); Oliver Skocek, Engelhartstetten (AT)

(73) Assignee: The Rockefeller University, New York, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/065,499

(22) Filed: Oct. 7, 2020

(65) Prior Publication Data
US 2021/0033843 A1    Feb. 4, 2021

Related U.S. Application Data

(63) Continuation of application No. 16/614,693, filed as application No. PCT/US2018/033417 on May 18, 2018, now Pat. No. 10,802,263.
(Continued)

(51) Int. Cl.
*G02B 21/36* (2006.01)

(52) U.S. Cl.
CPC ................. *G02B 21/367* (2013.01)

(58) Field of Classification Search
CPC ........... G06K 9/00147; G06K 9/00201; G06K 9/00127; G02B 21/008; G02B 21/367;
(Continued)

(56) References Cited

U.S. PATENT DOCUMENTS

| 6,943,724 B1 | 9/2005 | Brace et al. |
| 9,952,422 B2 | 4/2018 | Vaziri et al. |

(Continued)

OTHER PUBLICATIONS

International Search Report of PCT/US2018/033417 dated Aug. 9, 2018.

*Primary Examiner* — Paulos M Natnael
(74) *Attorney, Agent, or Firm* — NovoTechIP International PLLC

(57) ABSTRACT

An imaging signal extraction apparatus comprising: an interface; a processing device, the processing device operatively coupled to the interface; and a computer readable medium comprising instructions that, when executed by the processing device, perform operations comprising: a) generating a two-dimensional image from imaging information obtained from the interface, thereby estimating ballistic component of the imaging information; b) generating a three-dimensional image by remapping the two-dimensional image; c) identifying a candidate object in the three-dimensional image; d) obtaining an estimated spatial forward model of the candidate object by mapping the three-dimensional image of the candidate object with a point-spread-function associated with the imaging apparatus; e) obtaining background-corrected data by using the estimated spatial forward model of the candidate object and estimated temporal components; and f) iteratively updating the estimated spatial forward model and estimated temporal components until convergence is reached for the candidate object, thereby extracting the signal information.

23 Claims, 8 Drawing Sheets

Related U.S. Application Data

(60) Provisional application No. 62/640,377, filed on Mar. 8, 2018, provisional application No. 62/508,604, filed on May 19, 2017.

(58) Field of Classification Search
CPC ........ G02B 3/0006; G06T 2207/10056; H04N 5/2256

See application file for complete search history.

(56) References Cited

U.S. PATENT DOCUMENTS

| | | |
|---|---|---|
| 10,317,390 B2 | 6/2019 | Vaziri et al. |
| 10,613,312 B2 | 4/2020 | Cogswell et al. |
| 10,802,263 B2 * | 10/2020 | Vaziri ................ G06K 9/00147 |
| 2008/0025627 A1 | 1/2008 | Freeman et al. |
| 2009/0263002 A1 | 10/2009 | Cremer et al. |
| 2013/0235383 A1 | 9/2013 | Boccara et al. |
| 2016/0062100 A1 | 3/2016 | Cohen et al. |
| 2017/0031151 A1 | 2/2017 | Cogswell et al. |
| 2020/0201018 A1 * | 6/2020 | Vaziri .................... G06T 5/003 |

* cited by examiner

IMAGING SIGNAL EXTRACTION APPARATUS AND METHODS OF USING SAME

This application is a continuation of U.S. application Ser. No. 16/614,693, filed Nov. 18, 2019, which is a U.S. National Phase application of International Application No. PCT/US18/33417, filed May 18, 2018, which claims the benefit of U.S. Provisional Application No. 62/640,377, filed Mar. 8, 2018, and U.S. Provisional Application No. 62/508,604, filed May 19, 2017; the disclosures of which are incorporated herein by reference in their entireties.

The invention was made with government support under contract no. D16PC00002 Intelligence Advanced Research Projects Activity (IARPA) awarded by the Department of Interior/Interior Business Center (DoI/IBC). The invention was also made with government support under grant no. DBI-1707408 awarded by the National Science Foundation. The government has certain rights in the invention.

BACKGROUND OF THE INVENTION

Field

The disclosed embodiments relate to extracting signals from time series recordings, including, for example, imaging recordings, e.g., imaging recordings in a scattering medium.

Related Art

Understanding multi-scale integration of sensory inputs and the emergence of complex behavior from global dynamics of large neuronal populations is a fundamental problem in current neuroscience. Only recently, the combination of genetically encoded Calcium ($Ca^{2+}$) indicators (GECIs)[1] and new optical imaging techniques has enabled recording of neuronal population activity from entire nervous systems of small model organisms, such as C. elegans[2,3] and zebrafish larvae[4,5] at high speed and single-cell resolution. However, single-cell resolution functional imaging of large volumes at high speed and great depth in scattering tissue, such as the mammalian neocortex, has proven challenging.

A major limitation is the fundamental trade-off between serial and parallel acquisition schemes. Serial acquisition approaches, such as standard two-photon scanning microscopy (2PM)[6], in which spatial resolution is determined by the 3D locations of the excitation, provide robustness to scattering and signal crosstalk in the emission path, as the emitted fluorescence is integrated on a point detector. This capability has made 2PM the standard method for deep tissue imaging[7]. However, this has been achieved at the expense of temporal resolution since the excitation spot needs to be scanned in 3D. More recently, a number of approaches have been developed to alleviate this restriction[8] at the cost of increased complexity, e.g., by scanning faster using acousto-optic deflectors[9], remote focusing using mechanical actuators[10] or acousto-optical lenses ii, temporal or spatial multiplexing[12-14], by selectively addressing known source positions by random access scanning[15-17], or by sculpting the microscope's point spread function (PSF) in combination with a more efficient excitation scheme[18].

In contrast, parallel acquisition schemes, such as wide-field epi-fluorescence microscopy, light-sheet microscopy[19,20,5], including multi-view light-sheet techniques[21] and swept confocally aligned planar excitation[22], wide-field temporal focusing[2], and holographic approaches[23-25] can improve temporal resolution. Typically, in these methods, multiple regions or the entire sample are excited simultaneously and the fluorescence light is detected using 2D sensor arrays. Typically, however, light scattering mixes fluorescence signals originating from distinct neurons and degrades information about their locations. Thus, parallel acquisition schemes have been mostly limited to highly transparent specimens or to the most superficial regions of scattering tissues, such as the mammalian cortex.

SUMMARY OF THE INVENTION

The embodiments disclosed herein include an imaging signal extraction (e.g., demixer), apparatus which includes an imaging apparatus interface, a processing device, and a computer-readable medium. The imaging apparatus can be any apparatus that maps a three-dimensional sample volume location onto a two-dimensional sensor location in a specific manner. An example of such a device is a light-field microscope. The processing device is operatively coupled to the imaging apparatus interface. The computer readable medium includes instructions that, when executed by the processing device, perform operations including (a) generating a two-dimensional image (e.g., two-dimensional standard deviation image), from imaging information obtained from the imaging apparatus interface, thereby estimating ballistic component of the imaging information, (b) generating a three-dimensional image (i.e., 3D volume) by remapping (e.g., deconvolving) the two-dimensional image, (c) identifying a candidate object in the three-dimensional image, (d) obtaining an estimated spatial forward model of the candidate object by mapping (e.g., convolving) the three-dimensional image of the candidate object with a point-spread-function associated with the imaging apparatus, (e) obtaining background-corrected data by using the estimated spatial forward model of the candidate object and estimated temporal component, and (f) iteratively updating the estimated spatial forward model and estimated temporal components until convergence is reached for the candidate object, thereby demixing the signal information.

In one embodiment, before operation (a), background information obtained by the imaging apparatus may be subtracted, using the imaging apparatus interface. The background information may be background fluorescence obtained from a light-field microscope, and the subtraction of the background information may include applying rank-1-matrix factorization. Operation (a) may include determining the standard deviation of a time series of camera frames, and operation (b) may include using a point-spread-function associated with the imaging apparatus. The point spread function can be numerically simulated or experimentally obtained, and can be a ballistic or non-ballistic spread-function. Before operation (b), the two-dimensional standard deviation image may be thresholded to exclude residual background activity, and operation (b) further may include reducing reconstruction artefacts by incorporating total-variation and sparsity constraints into the remapping (e.g., deconvolution).

Reducing reconstruction artefacts may include applying the equation $x_{n+1}=x_n(P^T y/P^T P y + \lambda 1_{dim(x)})$, wherein x represents a volume estimate, $1_{dim(x)}$ represents a vector of ones with same dimension as x, P represents the point-spread-function, λ represents weight of a sparsity-encouraging term, and y represents the background subtracted raw data. Operation (c) may include using spatial segmentation to suppress spatial frequencies incompatible with object shapes. The spatial segmentation may include applying a bandpass filter to the three dimensional image, thresholding to exclude background artefacts, and applying a local maximum search algorithm. Operation (d) of mapping (e.g., convolving) the three-dimensional image of the candidate object with the point-spread-function associated with the imaging apparatus may include producing a sparse non-negative p×n matrix $S_i$, wherein n is the number of object candidates, p is the number of pixels and i is the iteration number, wherein $S_0$ is the initial spatial forward model of the candidate object. Operation (e) may include generating a p×t matrix Y using the matrix product of $S_0$ and $T_0$, wherein $T_i$ is a non-negative n×t matrix of temporal components, wherein t is the number of time steps in the recording. $T_i$ may be obtained by iteratively applying an adapted Richardson-Lucy-type solver with a sparsity constraint. Iteratively updating the estimated spatial forward model and estimated temporal components may include (i) obtaining an updated estimated $S_i$, while keeping estimated $T_i$ constant, (ii) obtaining an updated estimated while keeping estimated $S_i$ constant, and (iii) iteratively repeating operations (i) and (ii) until convergence is reached for the object candidate. The candidate object may be a neuron.

In addition to enabling efficient signal extraction in a scattering medium (e.g., scattering tissue) and providing increased temporal and spatial fidelity in semi-transparent specimens, a key advance of the disclosed embodiments is a dramatic reduction in computational cost compared to previous image reconstructions (e.g., image reconstructions for LFM) and post-processing by three orders of magnitude. This enables a range of qualitatively new applications, including real-time whole-brain recording, closed loop interrogation of neuronal population activity in combination with optogenetics and behavior, and the application of advanced machine learning techniques to analysis of data.

In another embodiment, the imaging signal extraction apparatus includes an imaging apparatus interface, a processing device operatively coupled to the imaging apparatus interface, and a computer readable medium comprising instructions that, when executed by the processing device perform operations. The operations include generating a two-dimensional image from imaging information obtained from the imaging apparatus interface, thereby estimating ballistic component of the imaging information, generating a three-dimensional image by remapping the two-dimensional image, identifying a candidate object in the three-dimensional image. obtaining an estimated spatial forward model of the candidate object by mapping the three-dimensional image of the candidate object with a point-spread-function associated with the imaging apparatus, obtaining background-corrected data by using the estimated spatial forward model of the candidate object and estimated temporal components, and iteratively updating the estimated spatial forward model and estimated temporal components until convergence is reached for the candidate object, thereby extracting the signal information. The imaging apparatus interface includes hardware developed using a Miniscope platform, an implanted endoscopic GRIN relay, a sensor, and a microlens array. The microlens array is aligned and mounted in close proximity to the sensor such that a back focal plane and a sensor plane coincide. The microlens array may be disposed in an optical path of an image plane one focal length away from the sensor. The apparatus may also include a holding member configured to hold the sensor. The holding member may be elongated by 2.7 mm when compared with the Miniscope design.

In one embodiment, the invention provides a method of extracting imaging signals. The method comprises using an imaging apparatus interface that is operatively coupled to a processing device. The processing device performs the following operations: a) generating a two-dimensional image from imaging information obtained from the imaging apparatus interface, thereby estimating ballistic component of the imaging information; b) generating a three-dimensional image by remapping the two-dimensional image; c) identifying a candidate object in the three-dimensional image; d) obtaining an estimated spatial forward model of the candidate object by mapping the three-dimensional image of the candidate object with a point-spread-function associated with the imaging apparatus; e) obtaining background-corrected data by using the estimated spatial forward model of the candidate object and estimated temporal components; and f) iteratively updating the estimated spatial forward model and estimated temporal components until convergence is reached for the candidate object, thereby extracting the signal information.

Other embodiments will become apparent from the following detailed description considered in conjunction with the accompanying drawings. It is to be understood, however, that the drawings are designed as an illustration only and not as a definition of the limits of any of the embodiments.

Figure 1:
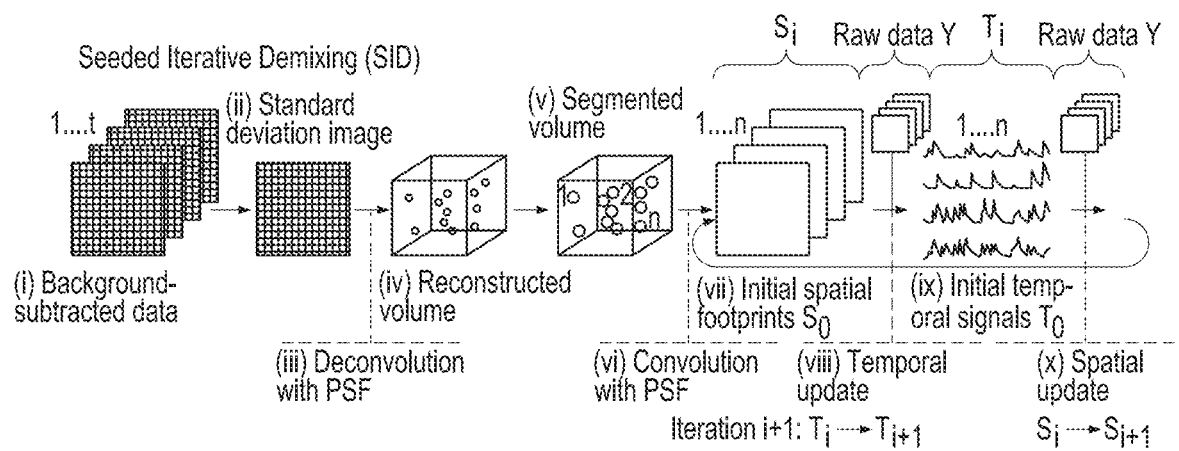
FIG. 1—Seeded iterative demixing of light-field recordings in scattering tissue. Illustration of key steps in the Seeded Iterative Demixing (SID) algorithm.
Figure 2:
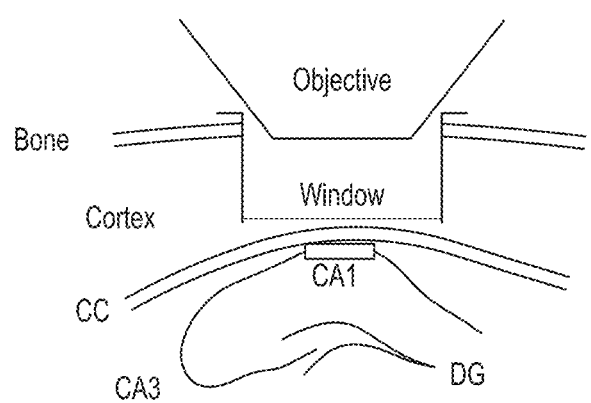
FIG. 2—Video-rate volumetric $Ca^{2+}$ imaging in mouse hippocampus. Schematics of the hippocampal window preparation, indicating corpus callosum (CC), and region of hippocampus proper *Cornu Ammonis* (CA1, CA3) and dentate gyrus (DG), the rectangle above CA1 indicates the approximate imaging volume.

It is to be appreciated that elements in the figures are illustrated for simplicity and clarity. Common but well-understood elements that are useful or necessary in a commercially feasible embodiment are not shown in order to facilitate a less hindered view of the illustrated embodiments.

DETAILED DESCRIPTION OF THE INVENTION

The disclosed embodiments relate to extracting imaging signals from time series recordings. A time series is a series of data points indexed in time order. An example of extraction of imaging signals is demixing of signals from imaging recordings, in particular imaging recordings in a scattering medium.

The imaging signal extraction apparatus of the disclosed embodiments (1) exploits the high resolution spatial information contained in remnant ballistic light, as well as extract directional information from scattered light, (2) incorporates the particular imaging apparatus' point spread function (PSF) and the effects of scattering, and (3) extracts (e.g., demixes) signals from close lying sources within a volume (e.g., demixes the effects of scattering) by utilizing both the spatial and temporal information present in the imaging data without requiring further assumptions on source positions or signal characteristics.

In one embodiment, an imaging signal extraction apparatus is provided. The apparatus includes an apparatus interface, a processing device, which is operatively coupled to the apparatus interface, and a computer readable medium including instructions, that, when executed by the processing device, perform operations to extract (e.g., demix) signal information.

The imaging signal extraction apparatus can be any apparatus which maps three-dimensional (3D) images onto a two-dimensional (2D) sensor array, in particular, those that use parallel acquisition schemes. Examples of such imaging apparatus include a light-field microscope (LFM), wide-field epi-fluorescence microscope, light-sheet microscope, including multi-view light-sheet techniques and swept confocally aligned planar excitation, wide-field temporal focusing and holographic approaches. Typically, in these methods, multiple regions or the entire sample are excited simultaneously and the fluorescence light is detected using 2D sensor arrays.

Imaging with Light-Field Microscope

In a preferred embodiment, the imaging apparatus is the LFM. The LFM achieves extremely high volume acquisition rates (limited only by GECI response dynamics and camera frame rate) at large fields-of-view by efficiently mapping 3D volumetric information onto a 2D sensor array, wherein a microlens array is placed in the image plane of a microscope, and a camera in the focal plane of the microlens array. This results in a spatially varying point-spread function (PSF), which encodes both the spatial and angular coordinates of incident light rays into 2D patterns on the sensor. The full 3D information is captured by a single camera exposure and retrieved offline by computational remapping (e.g., deconvolution) of the raw images.

Among parallel acquisition techniques, Light Field Microscopy (LFM)[4,26-29] is a particularly simple yet powerful approach to high speed volumetric $Ca^{2+}$ imaging in small semi-transparent model systems, such as C. elegans and zebrafish larvae.[4] LFM stands out from competing imaging methods by not requiring any time-consuming scanning of the excitation beam to collect 3D information. Moreover, in contrast to methods based on two-photon excitation, LFM does not require expensive and complex ultrafast laser systems and is not prone to sample heating and nonlinear photo-damage.

LFM achieves extremely high volume acquisition rates (limited only by GECI response dynamics and camera frame rate) at large fields-of-view by efficiently mapping 3D volumetric information onto a 2D sensor array, wherein a microlens array is placed in the image plane of a microscope, and a camera in the focal plane of the microlens array. This results in a spatially varying point-spread function (PSF), which encodes both the spatial and angular coordinates of incident light rays into 2D patterns on the sensor. The full 3D information is captured by a single camera exposure and retrieved offline by computational remapping (e.g., deconvolution) of the raw images.[4,27]

The information that LFM collects is vectorial and redundant in nature.[29,30] In LFM, both the positions and directions of incident light rays are recorded, and the ensemble of all rays emitted by a point source and transmitted by the optical system forms a highly specific PSF pattern on the sensor.

However, conventional frame-by-frame reconstruction of LFM images[4,27] largely fails at harvesting the potential robustness inherent to LFM data, in addition to being highly computationally resource intensive.

On average, after propagating for the characteristic distance of one scattering length (~50-100 μm for visible light in the cortex[7]), some 34% of incident photons still travel in their original direction, which are referred to as "ballistic photons"; whereas the remaining photos are deflected by a random scattering angle. In brain tissue, the probability distribution of scattering angles, a Henyey-Greenstein distribution with anisotropy parameter g≈0.97, is not uniform, but strongly peaked around the forward direction. Thus, information on the original direction of the scattered photons is retained for several scattering lengths[7], but this information is blurred and spread into a cone-shaped region around the remaining ballistic photons.

In conventional wide field imaging, similar to the effect of a defocus, scattering causes image features to appear blurred and overlapping, rendering demixing a highly ill-posed mathematical problem. In contrast, in LFM, in the absence of scattering, a source located below or above the focal plane results in sharp and specific patterns on the sensor that encode both positional and angular information about the incident light field. In a scattering medium, the scattered photons in LFM are distributed over many sensor pixels around those illuminated by the ballistic photons. Notably, any directional information retained in the scattered rays manifests itself as a direction-specific gradient in the intensity distribution of scattered light, wherein a ballistic peak and gradient are due to scattering, as indicated by arrow. In the absence of scattering, deconvolution of the raw LFM images using a numerically simulated, ballistic $PSF_{4,27}$ allows nearby neurons to be resolved, and to faithfully recover their respective temporal signal. In the presence of scattering, however, the same image reconstruction method increasingly fails to faithfully recover the signals of nearby neurons with increasing depth due to crosstalk. In addition, scattered light leads to the emergence of reconstruction artefacts, and erroneous assignment of brightness to a diffuse background component. Together, these effects render signal extraction in scattering tissue using previously established deconvolution schemes$_{4,27}$ a non-trivial task.

However, since some directional information is retained in the scattered light field and recorded by LFM, a more robust signal extraction from raw LFM data is necessary. Methods based on spatial image segmentation 31,32 cannot be expected to yield useful results in the absence of clear contours. A more commonly used approach for extracting neuronal signals from (predominantly 2PM-based) $Ca^{2+}$ activity movies is based on Independent Component Analysis $(ICA)_{33}$. ICA can perform well when neurons are fairly well-separated. However, when the recorded images of a set of neurons overlap spatially or if their activities are strongly correlated, ICA often fails to demix these sources correctly$_{34}$. Methods based on non-negative, sparse and otherwise constrained spatio-temporal matrix factorization$_{34-37}$ surpass ICA in demixing capability for closely packed neurons, especially when spatial and temporal constraints are incorporated$_{34}$. On the practical level, however, these methods typically require appropriate initialization of spatial components with high accuracy for a robust and quick convergence of the algorithm. Furthermore, currently available implementations do not include information on the imaging system such as its PSF, let alone stochastic and unspecific processes such as scattering.

Neuronal Imaging with Head Mounted Apparatus

Capturing neuronal dynamics volumetrically at high speed and single cell resolution in freely behaving rodents has remained a major outstanding challenge in neuroscience. The combination of Light field microscopy (LFM) and Seeded Iterative Demixing (SID) enables realization of a scalable high-speed volumetric calcium imaging method for applications in the strongly scattering mammalian cortex.

A miniaturized head-mounted light-field microscope ("MiniLFM") was designed and built, which in combination with the SID algorithm enables calcium imaging within a volume of ~600×600×350 µm at 16 Hz volume rate, thereby capturing the dynamics of ~530 neurons per imaging session in the hippocampus of freely moving mice. Performance of the MiniLFM and optimized SID algorithm was proven by showing extraction and assignment of neuronal activity traces as deep as 345 µm from the surface of the implanted GRIN objective lens.

Another key feature is a unique rigid hardware design and head-mounting assembly that minimizes motion artifacts, while a dedicated processing pipeline detects any residual motions in the raw imaging data without the need for additional motion sensors and corrects for these to ensure that SID-processing remains unaffected. Moreover, the pipeline trains a model for the underlying firing rate and calcium indicator response dynamics and provides a robust estimate of the firing rate, even for the motion-affected frames.

To understand the highly integrated cognitive processes in mammals, as well as the neuronal basis of complex and ethologically relevant behavior, fast, depth-penetrating volumetric imaging techniques are used that are compatible with free behavior and social interaction. Before the current subject matter, all existing volumetric $Ca^{2+}$ imaging techniques capable of extracting information from the mammalian or avian brain required head fixation. A number of portable, head-mounted miniature microscopes have been developed that enable recording from freely moving animals$_{20A-24A}$, however, none of these is capable of volumetric imaging. Initial designs of head-mounted fluorescence imaging devices$_{20A,25A,26A}$ used optical fibers for light delivery from laser sources to implement confocal or two-photon excitation, while for fluorescence detection, readout via individual optical fibers$_{27A}$ as well as fiber bundles$_{21A}$ has been explored. Deep brain structures are accessible in a widefield configuration when implanted endoscopic elements such as gradient index (GRIN) rod lenses$_{27A}$ are used. More recently, single-photon, wide-field miniature microscopes ("Miniscopes")$_{22A-24A,28A}$ have been built that have enabled long-term recording of hippocampal place cells$_{28A}$, and studying the encoding of locomotion-relevant information in the dorsal striatum$_{24A}$ as well as the role of shared neural ensembles in the association of distinct contextual memories$_{23A}$. These studies highlight the importance of neuronal recording during unrestrained behavior to uncover the neuronal basis of ethologically relevant and complex behaviors.

One embodiment of the disclosed subject matter overcomes the aforementioned limitations by combining head-mounted miniature microscope ("Miniscope") technology$_{23A}$ with Light Field Microscopy-based $(LFM)_{3A,29A}$ detection and a computational strategy based on a constrained matrix factorization approach (Seeded Iterative Demixing, "SID")$_{4A}$ that offers increased robustness to light scattering. LFM allows capturing volumetric information in a single exposure of a 2D image sensor, while SID extends the reach of LFM into the scattering mammalian brain$_{4A}$. The disclosed subject matter provides a miniaturized head-mounted SID microscope using LFM hardware ("Mini-LFM"), which allows $Ca^{2+}$-imaging within a volume of ~700×600×360 µm at 16 Hz volume rate, thereby capturing the dynamics of ~810 neurons per imaging session at near-single-cell resolution in the hippocampus of freely moving mice. The SID algorithm$_{4A}$ allows the extraction and assignment of neuronal activity traces as deep as 360 µm from the surface of implanted GRIN objective lenses.

Figure 5:
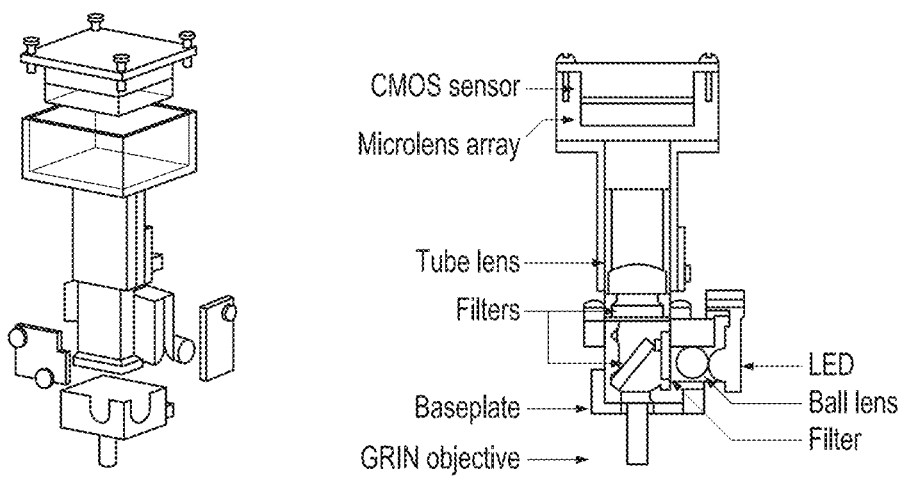
FIG. 5 shows the Head-mounted miniature Light Field Microscope (MiniLFM). Explosion (left) and section drawing (right) of MiniLFM are shown. Some parts are rendered transparently for visual clarity.
Figure 6:
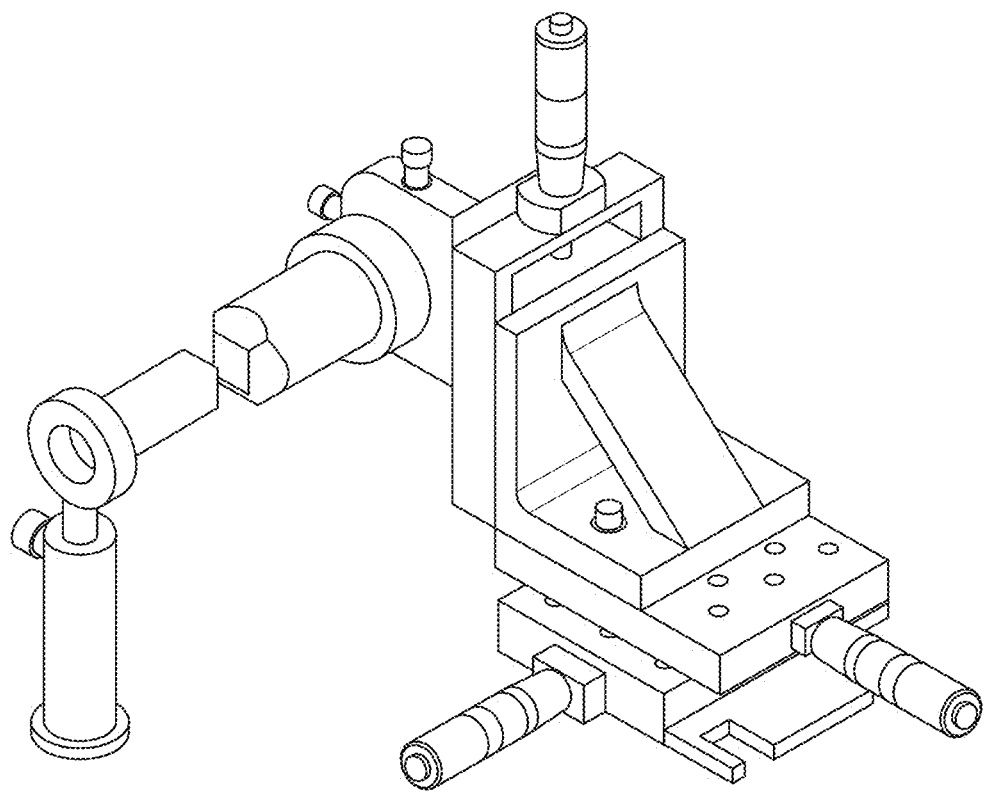
FIG. 6 shows a rendering of a MiniLFM MLA-to-sensor alignment jig. For aligning the MLA to the sensor chip, a pair of custom 4-finger holders (silver cylindrical slotted parts, center left) was designed that can be tightened using hose clamps (not shown). One clamp holds the MLA (not visible, occluded by clamp) and is mounted statically on a post/post holder (leftmost part). The other clamp holds the sensor (turquoise rectangle) and is itself held by a 6-axis kinematic mount (Thorlabs K6XS) for adjusting tip, tilt and rotation, and lateral position. The kinematic mount is attached to a 3-axis linear stage assembly (Thorlabs PTA3A/M) for adjusting MLA-to-sensor distance as well as for convenient coarse adjustment of lateral position.
Figure 7A:
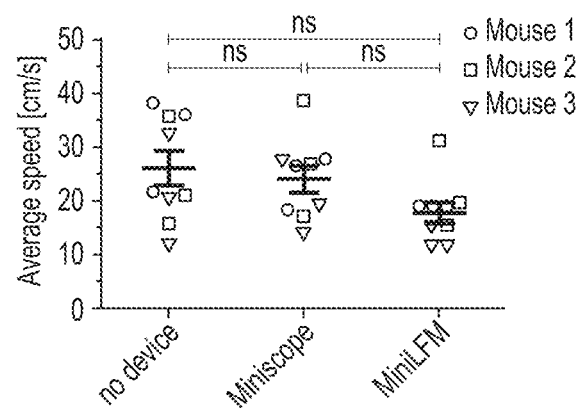
FIGS. 7A, 7B, and 7C include graphs showing a comparison of animal agility when wearing no device, Miniscope, and MiniLFM. Quantification of animal agility is shown from recordings of behavior on a linear track, after completion of training. Three mice; one trial under each condition per animal and day, for three consecutive days, resulting in a total n=27 trials. Trial duration: 10 minutes. Inter-trial break: 1 hour. Wide horizontal bars indicated mean, error bars are s.e.m. Data point color indicates animal. (a) Average walking speed. ns, not significant by one-way ANOVA. (b) Distance travelled per trial. ns, not significant by one-way ANOVA. (c) Number of stops made during trial. ns, not significant; *, significant at p<0.05 by one-way ANOVA (p=0.011).
Figure 7B:
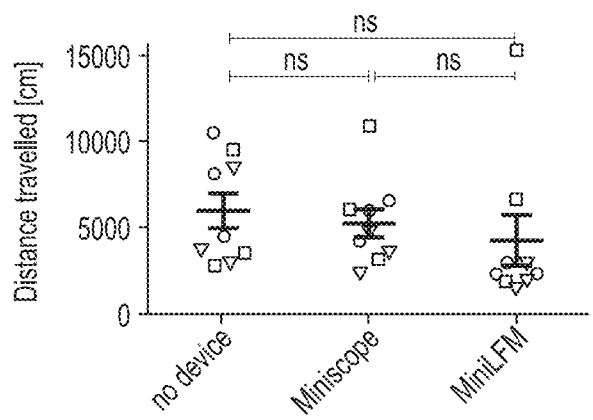
Figure 7C:
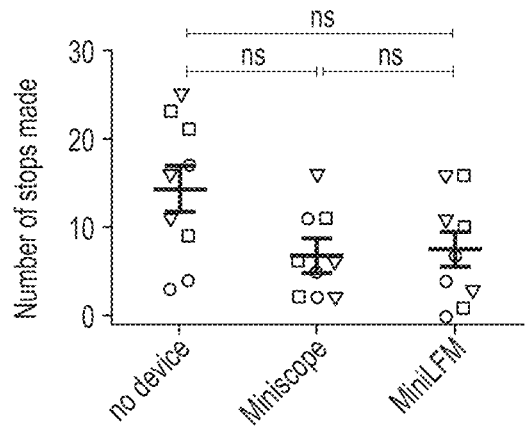
Figure 8:
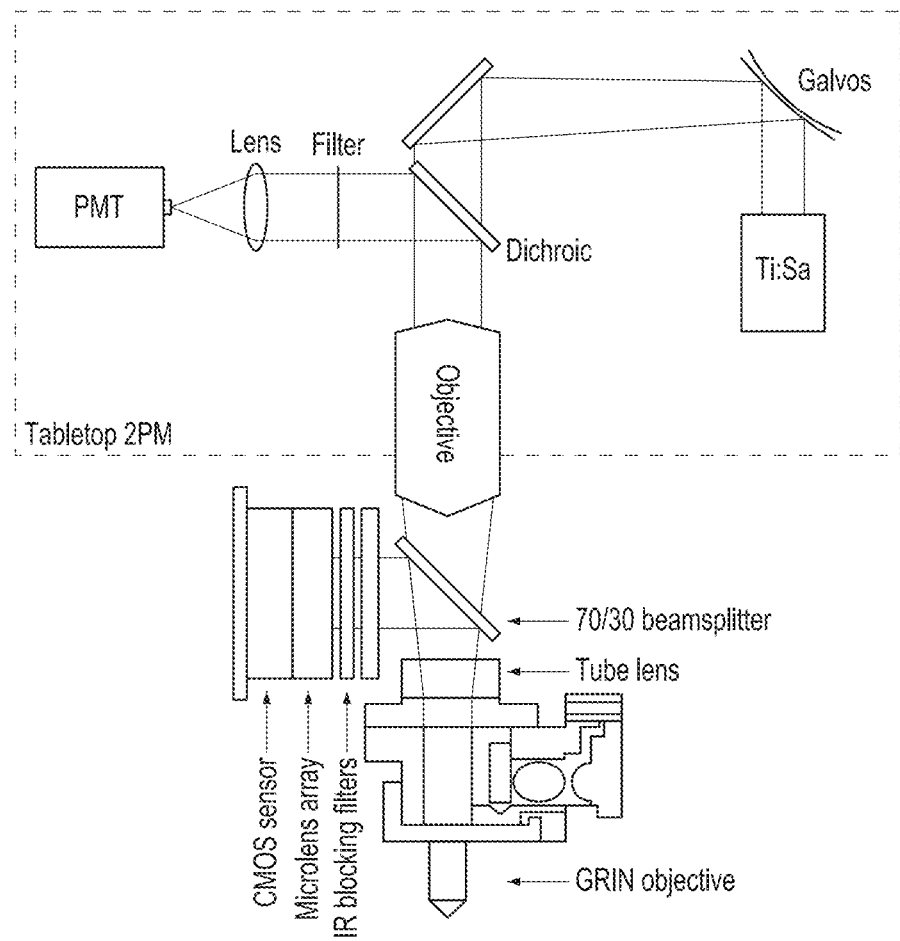
FIG. 8 is a sketch of an experimental setup used for simultaneous 2PM+MiniLFM/SID recordings.

The hardware design of the MiniLFM differs from typical LFM designs in two important aspects: First, the MiniLFM design (FIG. 5) leverages the open-source Miniscope platform$_{23A}$, which is optimized for minimal weight, simplicity of operation, and compatibility with implanted endoscopic GRIN relays to reach deep brain structures. Second, the typical configuration of relaying the focal plane of the microlens array (MLA) onto the camera sensor plane has been replaced with an approach in which the microlens array is aligned and mounted in close proximity to the sensor, such that the MLA back focal plane and the sensor plane coincide (FIG. 5). A major advantage of this approach is that by incorporating only one additional optical element, the microlens array, the overall weight of the MiniLFM is kept minimal.

The alignment strategy allows for accurate, quantitative optimization of MLA orientation and position relative to the image sensor prior to fixation. Exact alignment is critical, since good overlap between the numerically simulated point-spread function (PSF) of the system and the physical PSF is required for recovering the volumetric data from the 2D raw image by deconvolution$_{3,4,30,4}$.

The microscope achieves a lateral resolution of 80 line pairs per millimeter, which corresponds to a spot size of ~6 μm, and ~30 μm axial resolution. However, in the presence of scattering, the optical resolution is not generally what quantifies the limits for discriminating neurons. The actual spatial discriminability is further determined by factors, such as the amount of spatial overlap of the neurons' scattered spatial footprints on the sensor, in combination with the similarity of their activity in time. The minimum distance between their centroids, at which two neurons can be robustly demixed, is called herein "the discrimination threshold." In one embodiment, this threshold was found to be ~15 μm.

The head-mounted module is portable by an adult mouse, allowing it to move freely in an arena. Video shows adult mouse behaving and moving spontaneously for 50 s in arena. MiniLFM is screw-clamped into a baseplate that had been glued to the skull, and centered on an implanted GRIN objective lens. The data cable is suspended from an arm above the center of the arena. The potential effect of device weight on animal agility was characterized by recording and quantifying the animal's behavior on a linear track for three conditions: wearing a standard Miniscope, a MiniLFM, or no device. While, as expected, a slight trend in reduced agility from animals without a device to animals wearing the Miniscope, and from animals wearing a Miniscope to animals wearing a MiniLFM could be observed, no significant difference in distance travelled, number of stops, or the average speed, between MiniLFM and the Miniscope was found.

Next, the performance of the MiniLFM was verified by recording spontaneous volumetric activity of hippocampal CA1 neurons in freely moving mice. While the raw MiniLFM frames appear highly blurred on the camera and do not allow the identification of individual neurons, applying the SID algorithm allows for clear extraction of neuronal positions and corresponding activity time series in the CA1 pyramidal and *Stratum radiatum* layers down to a depth of 360 μm. Moreover, the ability of the method to perform volumetric recording reveals the shape of the pyramidal layer more clearly through the 3D rendering of the recoding volume. Neurons as closely spaced as ~8 μm can be found in the dataset, while the most frequent value for nearest-neighbor neuron distances is in the range of 12-16 μm.

The temporal signals corresponding to 807 active neurons identified in a 30-minute example recording. It was found that the typical shapes of Ca$^{2+}$ transients, as observed by other methods, to be reproduced faithfully, even for the neurons at the greatest recorded depths of ~360 μm. To validate this qualitative observation and to benchmark the ability of MiniLFM in combination with SID to detect and demix the activity of nearby neurons within the scattering mammalian brain, modifications were made to the MiniLFM that allowed simultaneous functional ground truth information on the activity of the same neurons to be obtained: By coupling the MiniLFM with a tabletop two-photon scanning microscope (2PM), hippocampal CA1 neurons could be excited and the neuronal activities could be detected simultaneously through the detection arm of the 2PM and the unmodified MiniLFM sensor module. A state-of-the-art signal extraction algorithm$_{31,4}$ followed by human inspection was used to establish the ground truth neuron positions and activity traces from the 2PM data. SID-extracted positions and activities were subsequently compared to the ground truth.

Despite the greatly reduced signal-to-noise ratios in both detection channels, due to the splitting of the fluorescence light into the two detection channels, as well as coupling inefficiencies, good agreement between MiniLFM/SID data and the ground truth was demonstrated. It was found that active neurons are detected accurately (precision score: 0.97±0.02) and reliably (sensitivity score: 0.79±0.04) by SID, resulting in an overall detection performance as quantified by the F-score of 0.87±0.03 (mean±s.e., pooled across all recordings). More detailed examination of the data revealed that both the locations and neuronal signals overlap well between MiniLFM/SID and ground truth recordings. To obtain an upper bound (conservative estimate) for the performance of SID under imaging conditions, the fidelity of the SID-extracted activity traces were characterized in two ways: First, the cross-correlation between the individual SID-extracted traces and their ground-truth counterparts were calculated and a median value of 0.88 was found, indicating a high general overlap. Note that in the utilized hybrid (2PM-MiniLFM) detection modality, both the obtainable signal similarity, as measured by cross-correlation, and the neuron detection performance (F-score) are limited by the achievable signal-to-noise ratio given by the suboptimal arrangement of 2P excitation through the GRIN lens in the hybrid setup, as well as the high MiniLFM sensor gain required to detect the signal. Under regular MiniLFM operating conditions, in which the fluorescence is generated via one-photon excitation, the signal level is orders of magnitude higher, which is expected to translate to comparable or better performance parameters during actual experiments with the MiniLFM.

Second, a metric was derived that quantifies any crosstalk that originates from suboptimal demixing of neuronal activity for distinct neuronal pairs and was investigated as a function of neuronal pair distance. To do so, the mutual information value found for each possible pair of ground truth traces was subtracted from those of the corresponding SID traces, and this difference was binned ("excess mutual information") as a function of the distance between of the two neurons. For large neuron distances, where the effects of crosstalk are negligible, it was observed, as expected, that the resulting excess mutual information value reaches a plateau around a low, noise-limited baseline. For short neuronal pair distances, however, the metric is expected to pick up any crosstalk-induced false similarities between traces that would result in an unphysiological increase of the excess mutual information value. However, no such increase could be detected in the recordings for shorter neuronal pair distances. Only when cutting the data to the level of individual calcium transients, eliminating the baselines, and thereby artificially boosting the sensitivity, could a minimal but significant increase in the value of the crosstalk metric be detected for neuronal pairs separated by less than ~15 μm. These analyses demonstrate that the approach can faithfully discriminate and achieve crosstalk-free demixing of neurons at separations around or larger than ~15 μm and establishes the value for what referred to as the "neuron discrimination performance."

Contamination of neural signals by neuropil activity could be another concern in a number of calcium imaging modalities, including those with reduced spatial resolution. This issue can be addressed on the molecular level by the using $Ca^{2+}$ indicators with expression localized to the cell nucleus. While the localization of GCaMP expression to the nucleus can reduce the sensitivity of the response and result in slower response times, it is an effective strategy to eliminate the neuropil signal. Using animals expressing a nucleus-localized version of GCaMP6, similarly well-separated sources, low or no apparent signal cross-talk, and good signal-to-noise ratio were found (despite somewhat lower observable overall neuronal activity). These observations, together with the ground truth recordings and analysis suggest that neuropil contamination is not a critical issue under the experimental conditions. While exhibiting slower dynamics, nuclearly confined indicators eliminate crosstalk and background from neuropil and can thus be anticipated to maximize signal quality and neuron separability under conditions with extremely high densities of active neurons, a high ratio of imaging volume occupied by processes, or more severe scattering, and ultimately extend the reach of MiniLFM/SID imaging to greater depths.

Minimizing motion-induced recording artifacts is essential in free-behavioral settings in which the brain and skull are naturally exposed to a larger degree of movement. The Miniscope body and skull-attached baseplate are designed to minimize motion of the optical system relative to the brain volume being imaged. Consistent with what has been reported in the literature[23,28], it has been found that motion effects are dominated by temporary lateral displacements of the FOV, an effect which is attributed to the axial rigidity of the main body. To minimize these displacements, in the disclosed subject matter, a baseplate has been glued rigidly to the skull over a large contact surface, and the MiniLFM main body is attached to the baseplate using magnets and fixed by tightening a screw against a metal-enforced facet of the body. The absence of any moving optomechanical parts and the relatively high frame rate significantly reduce the overall susceptibility to motion-induced perturbations of the $Ca^{2+}$ activity readout. The magnitude of motion-induced displacement of the recorded image was quantified by plotting the observable lateral (anterior-posterior and lateral-medial) shifts during a 10-minute regular (non-LFM) Miniscope recording, in which shifts are more directly observable than in MiniLFM/SID. The short-term lateral shifts were found to be typically on the scale of tenths of a neuron diameter in the lateral-medial direction, and less than a neuron radius in the anterior-posterior direction. The long-term drift throughout the entire recording is on the order of a tenth of a neuron diameter, and under the conditions is sufficiently small to allow for reliable re-identification of neurons across days and weeks, consistent with previous observations[28]. Further characterized was how strong mechanical impact, as induced when the microscope on an animal's head contacts the walls of the arena, may lead to residual motion artefacts. To address this issue, an algorithm was developed that automatically corrects for such motion events using a custom signal extraction pipeline that detects motion bursts in the raw imaging data, i.e. without requiring additional motion sensors. It applies the SID algorithm individually to the low-motion segments between the bursts and then pools all neuron detections across segments, exploiting the fact that neurons reliably return to their original locations in the field of view (FOV) after a motion burst as experimentally confirmed. Finally, a model of the GCaMP response kernel[31,4] is optimized for each neuron and subsequently used to interpolate the activity traces across motion-affected frames. At the same time, this model also yields a maximum-likelihood estimate of the underlying firing rates.

The motion detection metric that underlies this approach was verified by comparing it to data recorded simultaneously by an accelerometer attached to the MiniLFM. It was found that while not necessarily all acceleration peaks lead to motion artefacts in the functional imaging data, the two metrics are in clear qualitative agreement.

The disclosed embodiments (MiniLFM design) thus combines LFM, SID and Miniscope technology to provide a powerful strategy that enables fast volumetric imaging at low photobleaching and phototoxicity in scattering tissue of freely moving animals. The MiniLFM design establishes a simple and extensible platform that can be easily customized and adapted to other model animals. Together with the computational efficiency and neuron discrimination capability of the SID algorithm, the approach thus offers a unique platform for population-level studies of neural information processing in freely behaving animals and allows the analysis of the neuronal basis of social interaction.

Methods of Extracting Signal Information

In one embodiment, the operations performed to demix signal information include the following as discussed herein. A 2D standard deviation image is generated from information obtained from the imaging apparatus interface. The 2D standard deviation image estimates the ballistic component of the imaging information. Next, a 3D image is generated by remapping (e.g., deconvolving) the 2D standard deviation image. From the 3D image, a candidate object is identified. Next, an estimated spatial forward model of the candidate object is obtained by mapping (e.g., convolving) the 3D image of the candidate object with a PSF associated with the imaging apparatus. Next, background-corrected data is obtained by using the estimated spatial forward model of the candidate object and estimated temporal components. The estimated spatial forward model and estimated temporal components are iteratively updated until convergence is reached for the candidate object, thereby demixing the signal information.

In one embodiment, before the 2D standard deviation image is generated, background information obtained by the imaging apparatus is subtracted using the imaging apparatus interface. In one embodiment, the background information is background fluorescence obtained from the LFM. In one embodiment, subtraction of the background information includes applying rank-1-matrix factorization.

In one embodiment, the 2D standard deviation image is generated by estimating the ballistic component of the emitted signal by taking the standard deviation of the time series of camera frames. Since ballistic photons are spread across fewer sensor pixels than scattered light, signals from ballistically illuminated pixels have a higher variation in time for a given underlying source activity, and thus can be separated from the scattered component.

In one embodiment, the 3D image generated by remapping (e.g., deconvolving) the 2D standard deviation image includes unraveling 3D position information from the 2D image (e.g., 2D standard deviation image) by remapping (e.g., deconvolving) the 2D image with the numerically simulated, ballistic PSF of the associated imaging apparatus. In the presence of scattering, this approach results in volumes containing vastly sharper sources and reduced background than what would be obtained by deconvolving the raw data directly and subsequently calculating the standard deviation of the result. In one embodiment, before the 3D image is generated, the 2D image is thresholded to exclude residual background activity. In one embodiment, generation of the 3D image further includes reducing reconstruction artefacts by incorporating total-variation and sparsity constraints into the deconvolution. For example, reducing reconstruction artefacts can include applying the following equation:

$$x_{n+1} = x_n (P^T y / Py + \lambda 1_{dim(x)}), \quad (1)$$

wherein x represents a volume estimate, $1_{dim(x)}$ represents a vector of ones with the same dimension as x, P represents the point-spread-function, λ represents weight of a sparsity-encouraging term, and y represents background subtracted raw data.

A candidate object can be any spatially confined signal-emitting entity. In one embodiment, identification of a candidate object includes using spatial segmentation to suppress spatial frequencies incompatible with object shapes. Examples of object shapes can be any part of the anatomy of a biological being, including for example, a neuron, organ, bone, muscle, cellular structure, and/or tumorous growth. For example, neurons can be localized and separated in the 3D image, i.e., the reconstructed 3D volume. In one embodiment, the spatial segmentation includes applying a bandpass filter to the 3D image, thresholding to exclude background artefacts, and applying a local maximum search algorithm. The segmentation threshold is chosen to robustly reject noise and artefacts.

In one embodiment, the estimated spatial forward model of the candidate object obtained by mapping (e.g., convolving) the 3D image of the candidate object with a PSF includes producing a sparse non-negative p×n matrix $S_i$, wherein n is the number of object candidates, p is the number of pixels, i is the iteration number, and $S_0$ is the initial spatial forward model of the candidate object. For example, for each identified candidate object, the expected LFM footprint (e.g., its expected camera sensor pattern) is calculated by mapping (e.g., convolving) the 3D image of the candidate object with the PSF associated with the imaging apparatus.

In one embodiment, the background-corrected data obtained by using the estimated spatial forward model of the candidate object and estimated temporal components includes generating a p×t matrix Y using the matrix product of $S_0$ and $T_0$, wherein $T_i$ is a non-negative n×t matrix of temporal components, and t is the number of time steps in the recording. In one embodiment, $T_i$ is obtained by iteratively applying an adapted Richardson-Lucy-type solver with a sparsity constraint.

In one embodiment, iteratively updating the estimated spatial forward model and estimated temporal components includes i) obtaining an updated estimate of $S_i$ while keeping estimated $T_i$ constant, obtaining an updated estimate of $T_i$ while keeping estimated $S_i$ constant, and ii) iteratively repeating operation (i) until convergence is reached, for the object candidate. For example, an updated forward model estimate $S_1$ is found while keeping $T_0$ constant. In one embodiment, the problem is broken down by grouping the signals corresponding to spatially overlapping sets of components into k smaller matrices $T_0^k$ and finding updated spatial component estimates $S_1^k$ by solving a non-negative least-squares problem. During this update step, the rows of $S_1^k$ are forced to be zero outside of pre-defined masks derived from the ballistic footprints to ensure compact solutions. This procedure is iterated until convergence. Such procedure is a bi-convex optimization problem solved by alternatingly iterating the temporal and spatial update operations until convergence is reached.

In one embodiment, an iterative source extraction procedure for scattered LFM data, which is referred to as SID is provided. This procedure achieves accurate neuron localization and signal demixing by seeding inference with information obtained from remnant ballistic light. The estimates of the time series and the scattered images of each active neuron are iteratively updated by non-negative, constrained least-squares optimization.

The disclosed embodiment of SID represents a new scalable approach for recording volumetric neuronal population activity at high speed and depth in scattering tissue. This was done by addressing two key limitations of LFM for $Ca^{2+}$ imaging: the lack of robustness to scattering and high computational cost. The disclosed embodiments allow extending the application of LFM beyond semi-transparent model organisms to the scattering mammalian brain, enabling large-FOV, high volume rate readout of neuronal activity across multiple cortical layers in awake rodents. Such embodiments enable to reliably extract neuronal activity traces of cells expressing genetically encoded $Ca^{2+}$ indicators within a volume of ~900×900×260 μm in the mouse cortex, located as deep as 380 μm and at 30 Hz volume rate at a discriminability performance of 20 μm, as well as from similarly sized volumes in the mouse hippocampus.

Seeding the SID demixing algorithm with an initial estimate of source location information enables recovery of dynamical information from scattered photons in recordings, consistent with what is expected based on the scattering and isotropy parameters of the brain tissue. The disclosed embodiments highlight the advance of combining optical imaging with jointly designed computational algorithms to extract information from scattering media.

SID can robustly detect neurons at least to a depth of ~375 μm and recover the majority of actual neuronal signals with high fidelity in the presence of active neuropil. Compared to other existing methods for high-speed volumetric $Ca^{2+}$ imaging[9,15,17-22], SID stands out by its combined acquisition volume and speed, its simplicity and exceptionally low cost as well as its extreme scalability.

While some sequential acquisition methods based on 2P excitation may provide higher spatial resolution, unlike these, the voxel acquisition rate and resolution in SID are independent of the size of the acquired sample volume and only limited by the camera frame rate (up to 100 Hz) and fluorophore properties. It is, therefore, conceivable to extend SID to much larger FOVs without sacrificing its performance in speed and resolution, while at some point the combined obtainable volume size and speed in 2P techniques will be ultimately limited by tissue heating.

In contrast to single-photon techniques[5,26,27] including the various implementations of light sheet microscopy, SID extracts information from the scattered light allowing it to image in scattering specimen beyond what has been shown for other single photon techniques.

In one embodiment, the depth penetration, which may be affected by background fluorescence emerging from below the reconstructed volume, is addressed. In this embodiment, PSFs are modeled with a larger axial range which would be able to explain more of the recorded light in terms of localized sources rather than in terms of a diffuse background. Labelled and active neuropil contribute to this background, and hence soma-confined or nucleus-restricted $Ca^{2+}$ reporters assist to increase the obtainable depth range and the quality of the extracted signals.

In one embodiment, there is a correction for wavefront distortions caused by tissue inhomogeneities using adaptive optics[48] to increase resolution and source separability. Many biological applications may not require high labelling density, but rather targeted or sparse labeling, thus reducing background and greatly easing the task of neuronal signal assignment and demixing. Furthermore, GECIs fluorescing at longer wavelengths are generally beneficial for deep-tissue imaging, due to the increased scattering length in the red and near-infrared region of the spectrum.

Faithful extraction of neuronal signals may be limited by the loss of directional information due to multiple photon scattering. The critical depth for information loss is known as the transport mean free path and depends on the scattering length anisotropy parameter. In the mouse brain, it amounts to ~10 scattering lengths, or 500-1000 μm[7].

Previous implementations of image reconstruction and data extraction in LFM microscopy typically involved the use of a computing cluster [4], which severely limits both its dissemination among biological users and its use in real-time and closed loop applications. The disclosed SID renders this problem tractable on an individual workstation, enabling volumetric readout across multiple cortical areas and layers at unprecedented speed using widely available, simple hardware. In this context, the disclosed embodiments demonstrated three-order-of magnitude reduction in computational burden is not merely an incremental improvement but rather a transformative step that allows LFM-derived volumetric imaging approaches far exceeding existing scale and versatility. Computational imaging, especially plenoptic recording technologies such as LFM, combined with advanced machine learning for neuron identification and signal extraction[47] vastly improve the reach, applicability and acuteness of optical sensing.

EXAMPLES

The following examples confirm the effectiveness of the disclosed approaches using simulated data sets. In comparison to conventional deconvolution, the disclosed embodiments provide robust signal demixing up to a depth of about four scattering lengths (corresponding to up to ~400 μm in a mouse cortex). In addition, when applied to weakly scattering samples such as larval zebrafish, the disclosed algorithm delivers increased temporal and spatial fidelity.

To verify and characterize the demixing performance of the SID approach, it was applied to synthetic datasets containing randomly positioned neurons with partially correlated, GECI-like activity. A simulated scattered PSF using a Monte-Carlo approach[38] was generated, using values from literature for its parameters[7,39]. Then, volumetric frames containing the randomly positioned neurons with the scattered PSF were convolved to yield synthetic LFM raw data corresponding to a depth of approx. 400 μm in mouse cortex. Camera noise and background fluorescence was added with signal-to-background and signal-to-noise ratios chosen to match experimental data. Application of the SID algorithm to the synthesized data reliably demixed overlapping spatial footprints, and in cases where naïve signal extraction would give highly mixed signals, SID allowed for faithful signal demixing yielding close correspondence (mean correlation of 0.76) of the extracted signals. SID was found to require only a small difference in temporal activity and spatial footprint to faithfully differentiate the two entities.

Seeded Iterative Demixing (SID) Improves Source Localization in Zebrafish Larvae LFM-based $Ca_{2+}$ imaging has been shown to be capable of capturing neuronal activity from large parts of the brains of zebrafish larvae. While the unpigmented mutants commonly used for these experiments have remarkably low light absorption, these mutants are not fully transparent and exhibit some amount of scattering. Zebrafish larvae are therefore an ideal testbed for the present enhanced source extraction method. While allowing a baseline performance in the weak scattering regime to be established, imaging the larval zebrafish brain poses the additional difficulty of a higher neuron density than in the mammalian cortex.

In LFM, the lateral resolution is traded off with the ability to collect angular information from the light field. The parameters of the LFM design were chosen to yield a lateral resolution of 3.5 μm, corresponding to about half a neuron diameter in zebrafish larvae 5, and a field-of-view FOV of 700×700×200 μm, which is large enough to capture the brain from the olfactory bulb to the anterior part of the hindbrain.

Employing a custom hybrid two-photon and light-field microscope, the neuron positions extracted via SID were compared to a high-resolution 2PM image stack, using a volume of 775×195×200 μm in the anterior part of the zebrafish spinal cord. Spatial segmentation of the 2PM stack yielded a total of 1337 neurons within the above volume, which includes both active and inactive neurons. SID inherently detects active neurons only, and yielded 508 neurons whose positions clearly coincide with neurons in the 2PM stack. Spontaneous neuronal activity from the entire larval zebrafish brain covering a volume of 700×700×200 μm at 20 fps for four minutes was recorded. In this case SID found a total of 5505 active neurons.

Signals and neuron locations identified by SID were compared with an ICA-based analysis after conventional reconstruction of the same data. While in many cases ICA and SID yield matching pairs of positions and signals, it was found that ICA tends to over-segment the data by splitting up a neuron into several spatial filters with largely similar signals. Moreover, ICA-based analysis is also prone to identifying areas that contain scattered contributions from several surrounding neurons as false positive neurons, resulting in duplicate signals that exhibit severe crosstalk.

Overall, it was found that, when compared with ICA, SID typically identifies considerably more (~50% in this example) of the active neurons. Furthermore, the majority of signals identified by ICA were also recovered by SID (>0.8 cross-correlation between ICA and SID for 82% of ICA signals in the full image volume). At the same time, SID reliably rejects false positive signals identified by ICA.

Seeded Iterative Demixing (SID) Enables High-Speed Volumetric $Ca^{2+}$ Imaging in Mouse Cortex and Hippocampus at 380 μm Depth The severity of degradation due to scattering in standard LFM reconstruction becomes strikingly apparent when in vivo LFM data from the mouse cortex is conventionally reconstructed. When applying SID to LFM recordings acquired at various depths in the posterior parietal cortex of awake mice, the effectiveness of the disclosed embodiments became clear. The activity of neurons expressing GCaMP6m within a volume with a lateral FOV of ~900 μm diameter up to a depth of 380 μm at a volume acquisition rate of 30 fps was recorded using a cranial window. The computational efficiency of this approach enables reliable assignment of neuron positions and activity traces over larger axial ranges while at the same time greatly reducing computational cost. This allowed capture of locations and activities of neurons in mouse cortical layers I-III and part of the layer IV at 30 fps volume rate with only two successive recordings. The disclosed algorithm identified over 500 active neurons during a one-minute recording, corresponding to ~10% of all labeled neurons (5296) identified using a high-resolution 2PM. Of the total number of active neurons, 296 were in a depth range from zero to 170 μm and 208 active neurons in a range from 120 to 380 μm.

The disclosed algorithm allows for some tradeoff between false positive signals versus sensitivity to weak signals that can be adjusted by the user based on the biological question being studied. For all the results discussed herein, a rather conservative extraction strategy was used that prioritizes rejection of false positives over sensitivity to weak signals. Such a setting, along with the enforcement of post-selection based on spatial shape also allows for a more efficient rejection of the neuropil signal. However, depending on the biological question and GECI properties, the extraction strategy can also be tuned to result in less conservative estimates.

To further illustrate the versatility of SID, the disclosed method was applied to imaging of CA1 hippocampal neurons using a cranial window implanted after cortical aspiration[40,41]. Capturing the neuronal population activity within a volume of ~900×900×200 µm containing the cell body layer of CA1 neurons, $Ca^{2+}$ signals from 150 neurons arranged in the curved layer geometry typical of the anatomy of this region could be reliably identified, extracted, and demixed. The robust and pronounced $Ca^{2+}$ transients extracted by SID are consistent with the high-frequency bursts of neuron types in this brain region[42]. In summary, it was shown that SID reveals neuron positions and temporal signals to a depth of up to 380 µm in mouse cortex and hippocampus in vivo. In the next section, the extraction fidelity of the disclosed embodiments is verified by comparing it to 2PM recordings.

Seeded Iterative Demixing (SID) Allows for Demixing of Overlapping Neuronal Signals in the Mouse Brain while Providing Time Series Consistent with 2PM The capability of SID to demix neuronal signals in scattering tissue while providing neuronal time series that closely match those obtained by more established methods, such as 2PM, was experimentally demonstrated. Taking two CA1 neurons that are indistinguishable based on their spatial footprints, and which exhibit highly correlated activity, it was shown that SID can separate these neurons spatially and demix their time signals. To achieve this, SID requires only a few pixels within the spatial footprint of each neuron to eliminate crosstalk from the remaining neuron. The volumetric FOV and frame rate of LFM exceed those of other methods, such as 2PM, that are typically used for in vivo $Ca^{2+}$ imaging at similar depths in the mouse cortex. It is, therefore, impossible to establish an experimental ground truth for the disclosed embodiments by directly comparing the neuronal time series obtained by SID and 2PM within typical LFM volume sizes and volume acquisition rates. Nevertheless, experimental ground truth data was generated and validated that time series extracted using SID are indeed consistent with data from more established methods such as 2PM, within the limits of current technology. To do so, a 2PM excitation was performed in a single plane in the mouse cortex while simultaneously detecting the fluorescence using an LFM detection arm and a photomultiplier tube (PMT) point detector in the hybrid 2PM-LFM. The 2PM hardware allowed scanning a plane of 200×200 µm at 5 Hz. When comparing localization and signal extraction for twelve neurons found in this region using spatial segmentation on the obtained 2PM data, and SID on the LFM detection arm, it is clearly demonstrated that signals extracted by SID are in quantitative agreement with 2PM recordings, that yields 12 out of 12 active neurons detected, and a mean cross-correlation of signals from the two methods of 0.85.

Seeded Iterative Demixing (SID) Allows for Demixing and Localization of Overlapping Neuronal Signals in the Mouse Brain with Time Series Consistent with 2PM Ground Truth Next, the capability of SID to demix neuronal signals in scattering tissue while providing neuronal time series that closely match those obtained by more established methods, such as 2PM, was experimentally and systematically demonstrated. As an example on the single-neuron level, two CA1 neurons that were indistinguishable based on their spatial sensor footprints, and which exhibit highly correlated activity, were selected. SID can detect the neurons as individual neurons spatially and demix their corresponding time signals. To achieve this, SID only requires a few pixels within the spatial footprint of each neuron to eliminate crosstalk from the respective other neuron.

The volumetric FOV and frame rate of the disclosed embodiment exceed those of other techniques such as 2PM that are typically used for in vivo $Ca^{2+}$ imaging at similar depths in the mouse cortex. It is therefore impossible to establish an experimental ground truth for the disclosed embodiment by directly comparing the neuronal time series obtained by SID and 2PM within the typical volume sizes and volume acquisition rates. Nevertheless, experimental ground truth data were generated and time series extracted by SID were validated as being consistent with data from more established methods such as 2PM, within the limits of current technology. Such was done using a hybrid 2PM-SID microscope (see Methods). 2PM excitation was performed in a single plane in the mouse cortex while simultaneously detecting the fluorescence using the SID detection arm and a photomultiplier tube (PMT) point detector in the disclosed hybrid 2PM-SID. The 2PM hardware allowed scanning of a plane of 200×200 µm at 5 Hz. When comparing localization and signal extraction for twelve neurons found in this region using spatial segmentation based on watershed transform on the obtained 2PM data, and SID on data obtained in the LFM detection arm, it is clearly demonstrated that signals extracted by SID are in quantitative agreement with 2PM recordings (12 out of 12 active neurons detected; mean cross-correlation of signals from the two methods: 0.85).

To obtain a more comprehensive and quantitative evaluation of SIDs performance, a set of single-plane, simultaneous 2PM-SID movies at a series of axial depths (100-375 µm, total n=18 recordings) were recorded. Neuron positions and signals were extracted from the 2PM channel using a recently published and increasingly used method[36] based on constrained matrix factorization ("CaImAn"). The output of CaImAn was assessed and corrected manually to establish a ground truth, to which both the raw CaImAn output and SID were quantitatively compared.

Figure 3A:
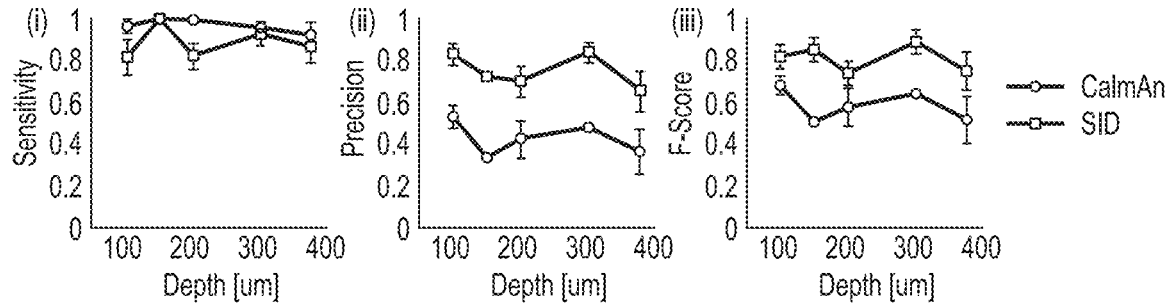
FIGS. 3A and 3B—Statistical analysis of SID neuron detection and signal extraction performance based on simultaneous 2PM-SID recordings; (a) neuron detection scores versus depth as achieved by SID (green traces), in comparison to scores achieved by the analysis package CaImAn applied to the 2PM data (blue traces), both evaluated with respect to a ground truth; (i) sensitivity score (ratio of number of detected to actual neurons); (ii) precision score (ratio of number of true positives to sum of true and false positives); (iii) F-Score (harmonic mean of sensitivity and precision) n=4; (b) comparison of SID extracted signals to ground truth; (i) correlation means versus depth and (ii) histogram of correlation coefficients of SID signals and their ground truth counterparts, shown for one example; (iii) examples of two pairs of SID (green) and corresponding ground truth (red) signal pairs and their respective correlation coefficients; (iv) ratio of SID-signals with correlation to ground truth of less than <0.5 versus imaging depth.
Figure 3B:
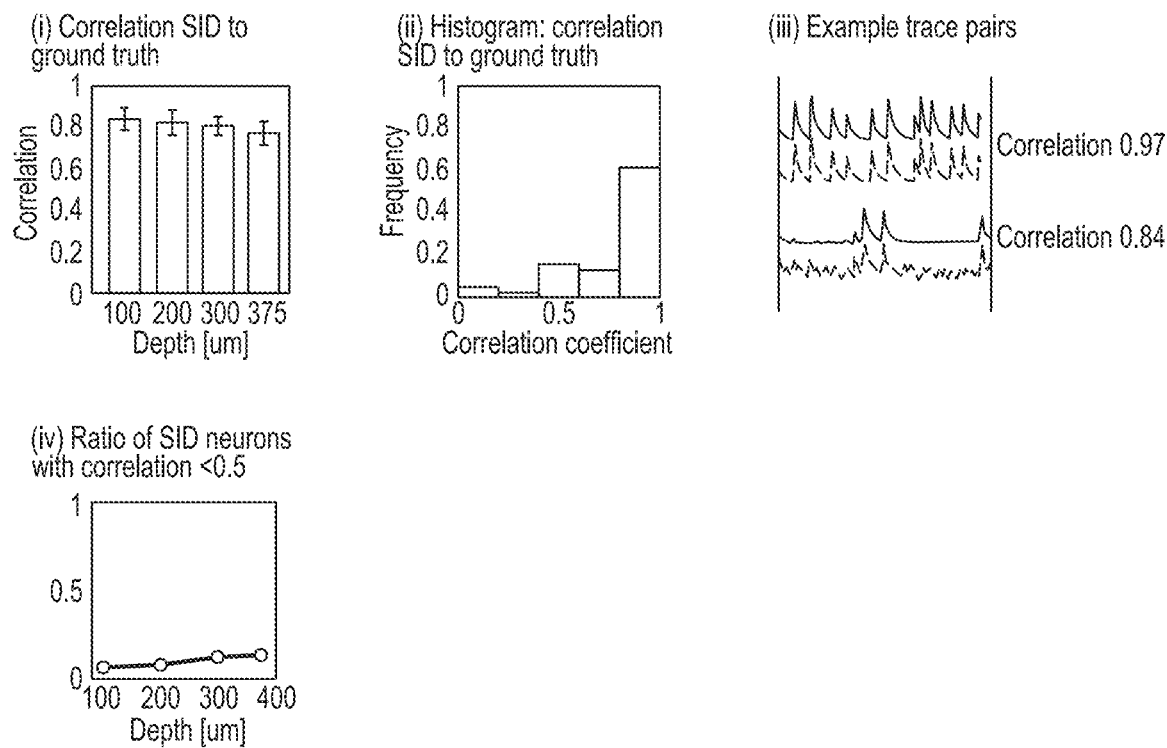

In FIG. 3a, the neuron detection performance of the two methods at different tissue depths were illustrated by plotting the ratios of true neurons that were detected correctly, the "Sensitivity" score (FIG. 3a(i), the ratio of false positive detections to total detections, "Precision" (FIG. 3a(ii), and the harmonic mean of these two quantities, the "F-Score" (FIG. 3a(iii). While there is a tradeoff between Sensitivity and Precision, F-Score can be used as a parameter to characterize the overall performance of each method. Both methods identify most actual neurons correctly (FIG. 3a). However, SID is less prone to false positive classifications (FIG. 3b). Overall, SID offers a comparable or better compromise between sensitivity (sensitivity score) and robustness (Precision score) resulting in slightly higher F-Scores.

The quality of the SID-extracted neuronal activity traces compared to ground truth was characterized at different depths in FIG. 3b. The mean correlation between SID-extracted and 2PM ground truth signals decays only moderately from 0.84±0.05 at 100 µm depth to 0.77±0.05 at 375 µm (FIG. 3b(i)). Of all true positive SID detections, 73% have a correlation with ground truth of better than 0.8, and 60% better than 0.9 (FIG. 3b(ii) histogram and FIG. 3b(iii) example trace pairs) while only 10% of extracted signals exhibit a low (<0.4) correlation with 2PM ground truth and correspondingly a degraded overlap of the neuronal signal due to crosstalk with nearby neuropil. To gain an insight into the dependence of such mismatches as a function of tissue depth, how the fraction of SID-extracted neurons with a correlation to ground truth of less than 0.5 depended on tissue depth was calculated (FIG. 3b(iv)). Their fraction was found to represent only 6% at 100 µm depth and about 12% at 375 µm. While this shows that SID can correctly identify and assign neuronal signals for the vast majority of neurons even in a densely-labeled sample, as the main source of the above mismatches were interactions with the neuropil. Even better results are obtained by eliminating neuropil labelling by using soma- or nucleus-confined $Ca^{2+}$ indicators. In addition, a computational strategy for demixing and rejecting neuropil contributions from the signals was also outlined.

Next, SID's performance to demix signals of nearby neurons was investigated. Both physiological correlation of neuronal signals, which are known to generally increase with decreasing neurons pairs distances, as well as degradation of SID's performance at short neuron pair distances are expected to result in an increase in the observed correlation for decreasing distance of neuron pairs. To dissect the underlying drivers of such observed correlations for the SID extracted pairs, their dependence on whether the underlying ground truth pair dynamics was correlated or uncorrelated was investigated. To identify such ground truth neuronal pairs, the corresponding cross-correlation matrix and histogram were calculated. Subsequently, all uncorrelated neuronal pairs (<0.2) as well as correlated neuronal pairs (>0.6) were selected and the correlations of the corresponding signal pairs in SID were examined. An increase in correlation for pairs of uncorrelated ground truth neurons for separations smaller than ~20 µm was found; while for pairs with correlated ground truth activity, the corresponding SID extracted pairs exhibited a similar correlation as their ground truth pairs over a range of lateral distances and for as close as ~20 µm. The above un-physiological increase in the observed correlation for uncorrelated ground truth neuron pairs extracted by SID below ~20 µm as well as the consistency of SID with correlated ground truth pairs, down to approximately the same distance, provides a metric that represents the discriminability achieved by the disclosed SID algorithm, i.e. its ability to detect and assign neuronal time series in the scattering mouse brain. The limit of SID is reached when SID starts to detect artificial "correlations" between neurons known to be un-correlated.

Methods

Hybrid Light Field and Two-Photon Microscope

The microscope used for simultaneous 2PM and LFM imaging, the fish recordings and mouse recordings is built around a Scientifica Slicescope platform with a custom LFM detection arm.

The two-photon excitation source (Coherent Chameleon) delivered 140 fs pulses at 80 MHz repetition rate and 920 nm wavelength. The beam intensity was controlled via an electro-optical modulator (Conoptics) for attenuation and blanking, and fed into a galvo-based scan head (Scientifica). The 2P path and the one-photon excitation/LFM detection path were combined via a short-pass dichroic mirror (Semrock FF746-SDi01). One-photon excitation light from a blue LED (CoolLED pe-2) was fed into an Olympus epi-fluorescence illuminator and reflected into the LFM detection path via a standard EGFP excitation filter and dichroic.

Depending on the experiment, either one-photon or two-photon light was used while the other was blocked. Either was focused by a Nikon 16×0.8 NA water-dipping physiology objective into the sample. For zebrafish experiments, Olympus 20×1.0 NA and Olympus 20×0.5 NA water-dipping objectives were used.

Fluorescence from the sample was detected either by a non-descanned PMT arm, or the LFM arm, or split among both. The split ratio was determined by a main beam splitter inserted into the beam path behind the objective. A custom detection head design allowed for quick switching between configurations that route 100% to the PMTs (665 nm long-pass dichroic, Scientifica), 100% to the LFM arm (no filter), or split the fluorescence 10:90 or 50:50 (PMT:LFM) (Omega 10% beam sampler or Thorlabs 50:50 vis beam splitter, respectively). The PMT detection arm consisted of an IR blocking filter, collection lens, 565LP dichroic, and 525/50 nm and 620/60 nm emission filters with, and Scientifica GaAsP (green channel) and alkali (red) PMT modules.

For LFM detection, fluorescence passed through the short-pass dichroic that couples the laser into the beam path, as well as the one-photon filter cube. The image formed by a standard Olympus tube lens was then relayed via two 2-inch achromatic lenses (f=200 mm, Thorlabs) onto a microlens array (MLA, Okotech, custom model, size 1" square, f-number 10, 114 µm microlens pitch, quadratic grid, no gaps). The f-number of the MLA was matched to the output f-number of the microscope. The back focal plane of the MLA was relayed by a photography macro objective (Nikon 105 mm/2.8) at unity magnification onto the sensor of an Andor Zyla 5.5 sCMOS scientific camera, which can be read out at up to 75 fps at full resolution (2560×2160 px, 16 bit).

The setup was controlled from a dual-CPU workstation (HP Z820) with four solid-state disks in a RAID-0 configuration for fast image acquisition and National Instruments 6110 and 6321 cards for analogue and timing I/O. Experiments were controlled using Micro-manager and Scanimage for the one-photon and two-photon parts of the setup, respectively.

Source Extraction Algorithm and Data Analysis

The disclosed source extraction approach starts with a rank-1 matrix factorization of the time series of raw images to remove background and common-mode dynamics. A motion detection metric is computed on the background-subtracted images, and frames with a motion metric value above threshold are excluded from further processing. Next, the standard deviation of each pixel along time is computed, resulting in a "standard deviation image." The standard deviation image was deconvolved using a Richardson-Lucy-type algorithm (with non-negativity and, optionally, sparsity constraints) and a numerically simulated PSF, as described previously 4,29. This results in a volumetric frame containing neurons that are active in the recording as bright regions. The reconstructed volume is band-pass filtered and segmented using a local maximum search, resulting in a dictionary of neuron candidate positions. Each position is convolved with the simulated PSF to obtain an initial estimate of its (ballistic) footprint on the LFM camera. From each footprint, a Boolean mask mi was generated that is one at every pixel behind every microlens that receives a contribution from the ballistic footprint. The set of neuron footprints was collected into a non-negative p×n matrix S0, with n being the number of neurons found in the segmentation, and p the number of camera pixels. Also, let Y be the p×t non-negative data matrix (with t the number of time steps in the recording). A temporal update step is then performed by solving the non-negative least squares problem:

minimize $T\|Y-ST\|2$ subject to $T≥0$, where T is a non-negative n×t matrix T of temporal components, using an iterative solver. The background components found in the rank-1 matrix factorization performed earlier are inserted as an additional row and column of the S and T matrices, respectively, and therefore updated together with the neuron candidates.

Next, a spatial update step is performed: All sets $O^k$ of spatially overlapping components are found. For each of these k groups, matrices $T^k$ are formed, which contain all columns t of T that correspond to spatial components in $O^k$, and data matrices $Y^k$ that contain only those pixels that fall into the nonzero areas of masks mi in $O^k$. For each k, solve the following non-negative, spatially constrained least-squares problem is solved:

minimize $S^k\|Y^k-S^kT^k\|2$ subject to $S^k≥0$, rows of $S^k=0$ where masks $mi=0(\forall i \in O^k)$.

Then, the temporal and spatial update steps are iterated until convergence.

Finally, the integral of every spatial component is computed, which is normalized to one, and the temporal component are scaled by the integral. The temporal components are scaled individually to the standard deviation of the noise they contain (defined as the residual of a Savitzky-Golay fit).
Signal Extraction from Frame-by-Frame-Reconstructed LFM Datasets.

In order to extract the signals and spatial filters from standard LFM datasets (i.e., series of volumetric frames obtained by deconvolving the raw frames individually using a Richardson-Lucy type algorithm and a numerically simulated PSF), a custom Matlab implementation of an approach based on Ref. 35 was used: After fitting and dividing out a slowly-varying trend function from the data, the variances of all voxels over time were computed and the voxels above the 80th percentile of the variance distribution were selected to reduce problem size. Principal Component Analysis (PCA) is performed on the selected voxel time series. In order to avoid overfitting and to de-noise the data, the first 8% of PCA components are kept and fed into the FastICA Matlab package. The resulting ICA spatial components are post-selected based on their weight distribution: Only those containing prominent peaks (i.e., regions with values larger than the 20th percentile of the weight distribution) that are compatible in shape with a neuron are kept. The corresponding signals are extracted from the de-trended data by averaging over all voxels in the peak.
In-Vivo $Ca^{2+}$ Imaging of Head-Fixed Zebrafish Larvae.

For zebrafish experiments, elav13:H2B-GCaMP6s fish (n=4) were imaged 5-8 days post fertilization. This line expresses a nuclear confined calcium indicator pan-neuronally in a mitfa−/−, roy−/− background. Larvae were immobilized by embedding them in 2% low melting point agarose. For spinal cord recordings, larvae were paralyzed by injection of α-bungarotoxin (125 μM) into the heart cavity at least one hour before the experiment.

Animal Surgery and In-Vivo $Ca^{2+}$ Imaging of Awake Mice.

Surgery and experimental procedures fulfilled the Austrian and European regulations for animal experiments (Austrian § 26 Tierversuchsgesetz 2012-TVG 2012) and were approved by the IACUC of The Rockefeller University. Adult (P90+) male and female C57Bl/6J wild-type mice (n=10) were anesthetized with isoflurane (2-3% flow rate of 0.5-0.7 l/min) and placed in a stereotaxic frame (RWD Life Science Co., Ltd. China). After removing the scalp and clearing the skull of connective tissues, a custom-made lightweight metal head-bar was fixed onto the skull with cyanoacrylate adhesive (Krazy Glue) and covered with black dental cement (Ortho-Jet, Lang Dental, USA or Paladur, Heraeus Kulzer, GmbH, Germany). The head-bar was stabilized by anchoring it with up to 3 headless M1.4 screws inserted at the occipital and parietal bones. A circular craniotomy (3-5 mm diameter) was then performed above the imaging site (posterior parietal cortex, PPC, centered at ~2.5 mm caudal and ~1.8 mm lateral; primary motor cortex, M1, −2.5 mm anterior and 1.5 mm lateral; dorsal hippocampus 2.0-2.5 mm caudal and 1.4-1.8 mm lateral to bregma). With the skull opened and the dura intact, the GECI-carrying virus AAV8:hSyn-GCaMP6m was injected at 4-12 sites (25 nl each, at 10 nl/min; titer ~$10^{12}$ viral particles/ml) with a 400 μm spacing forming a grid near the center of the craniotomy, at a depth of 400-450 μm below dura for PPC and 1200 μm for hippocampus. The construct AAV2/1: Hsyn-JRGECO was injected. After the injections, a glass cranial window consisting of a 3-5 mm diameter, #1 thickness (0.16 mm) coverslip was implanted in the craniotomy, flushed with saline solution, placed in contact with the brain surface, and sealed in place using tissue adhesive (Vetbond). The exposed skull surrounding the cranial window was covered with dental cement to build a small chamber for imaging with a water-immersion objective. To access the dorsal hippocampus, a cranial window was implanted after cortical aspiration as previously reported. 42,43 To prevent post-surgical infections and post-surgical pain, the animals were supplied with water containing the antibiotic enrofloxacin (50 mg/Kg) and the pain killer carprofen (5 mg/Kg) for a period of ~7 days. After surgery, animals were returned to their home cages for 2-3 weeks for recovery and viral gene expression before subjecting to imaging experiments. Extreme care was taken to ensure that the dura experienced no damage or major bleeding before and after cranial window implantation. Mice with damaged dura or unclear windows were euthanized and not used for imaging experiments. During imaging sessions, the animals were head-fixed using a customized mount complemented with a head bar holder and a mouse body stabilizer (body jacket) and could freely run on a disk (200 mm diameter). Spontaneous activity was recorded. This considerably reduced animal induced motion of the brain during imaging. A ventilation mask was placed in front of the mouse nose to provide air puff mechanical stimulation to the mouse whiskers and face as well as to provide gas anesthesia on demand. Typical imaging session lasted continuously for 2-10 min.
SID Algorithm Implementation Details
Background Rejection Deep tissue LFM movies contain strong global background fluorescence which has to be subtracted before computing a standard deviation image and before any further steps. This background is mostly due to fluorescence originating from above and below the depth range captured by the numerically simulated PSF that is used for reconstruction. This background was extracted by applying a rank-1-matrix-factorization to the LFM raw data. The spatial and temporal components obtained from rank-1-matrix-factorization are added to the neuron candidates in the spatial and temporal update steps as an additional row and column of the S and T matrices, respectively. The background estimates are therefore refined during these optimization steps, and activity may be re-allocated from neurons to the background, and vice versa. In the temporal update step, this corresponds to an inherent background subtraction, while in the spatial update step, the shape of the background is refined.

Without background subtraction, the standard deviation image of an LFM movie is dominated by temporal variations in the background. A one-dimensional approximation of the background was sufficient to obtain the ballistic components of the neuron footprints. The standard deviation image was compared without and with background subtraction, respectively. It is evident that removing the background reveals LFM footprints of localized sources.

Reconstruction with Sparsity, Segmentation

The standard deviation images were reconstructed (deconvolved with numerically simulated PSF) using a modification of a Richardson-Lucy-type algorithm known as ISRA[1], which yields non-negative components. Classical LFM reconstruction based on Richardson-Lucy deconvolution with a ballistic PSF[2,3] is prone to blocky artefacts near the native focal plane of the microscope where the optical spatial sampling density is strongly reduced.[2] These artefacts are detrimental to the success of the subsequent segmentation procedure. When necessary, ISRA was modified with a sparsity constraint. The update step for volume estimate x is:

$$x_{n+1} = x_n(P^T y / P_{y+\lambda} 1_{dim(x)}),$$

where $1_{dim(x)}$ is a vector of ones with the same dimension as x, and P is the PSF. The parameter $\lambda$ governs the weight of the sparsity-encouraging term. $\lambda > 0$ was used for the zebrafish recordings. For deep mouse recordings, $\lambda = 0$ was set for performance reasons and instead discarded neuron candidates detected in the artefact region. Before reconstruction, standard deviation images were thresholded to exclude residual background activity.

Segmentation

In order to suppress spatial frequencies not compatible with neuron shapes, a bandpass filter was applied to the reconstructed standard deviation volume, followed by thresholding the result to exclude background. Then, a local maximum search algorithm was applied. Detected regions in a reconstructed standard deviation image are labelled with red dots. The segmentation threshold is chosen to robustly reject noise and artefacts.

Non-Negative Matrix Factorization

The algorithm proceeds as described in the Methods section of the main text, by alternating temporal and spatial update steps. While the initial spatial estimate only includes the ballistic footprint, the updated estimate increasingly incorporates the scattered light around it. The corresponding temporal components become more pronounced and increasingly de-mixed from overlapping signals.

Convergence

Both the spatial and temporal optimization steps are convex problems and, therefore, each converge to a global optimum. The combined problem is bi-convex and a variant of what is known as an alternate convex search[4] in the literature, which is a frequently used algorithm for this class of problem. The alternate convex search algorithm optimizes a bi-convex target function by splitting the problem into its convex sub-problems, initializes the solution with a guess, and iteratively solves one of the two sub-problems, while keeping the other variable fixed at the optimum of the previously solved sub-problem (or the initial guess), and then alternating the sub-problems until a stopping criterion is reached. It has been shown[4] that the iteration sequence pursued by the alternate convex search algorithm has at least one accumulation point, and that if each accumulation point has a unique solution for each of the sub-problems, then the difference between consecutive iterations converges to zero. The value of the target function is the same at each accumulation point, and reaches a partial optimum (i.e., an optimum in each of the convex variables). In a strict sense, the global optimality of the solution is not guaranteed. However, alternate convex search is routinely applied to bi-convex optimization problems, for instance in the context of $Ca^{2+}$ imaging for spatio-temporal demixing of 2PM data[5], with good success.

For both the spatial and temporal update steps, the ISRA algorithm was used without a sparsity constraint. It was found to parallelize efficiently across multiple CPU-cores as well as thousands of GPU-cores, allowing for quick solution of large problems (thousands of pixels times thousands of time steps within approximately 1 GPU-second per neuron). Fast convergence and aborting the algorithm after approximately 10 iterations was routinely observed, when the residual has been reduced by four orders of magnitude. At such point, no spatial or temporal structure is evident in the residual data.

Synthetic Dataset Generation

The synthetic dataset was generated as follows, using literature values for the parameters[7-9]: 40 neurons (spheres of 8 µm diameter) were randomly placed in a volume of 70×70×200 µm, maintaining a minimum distance of one neuron diameter, and surrounded by a margin of 25 µm on each side to avoid border artefacts. The simulated neuron density was chosen to be 40,000 per cubic millimeter. This is lower by a factor of approximately two than the average density reported for mouse cortex[10], to account for the fact that not all neurons are active during a given recording. The volume size was chosen large enough to span most of the LFM axial range, and for scattered neuron images originating from distant sides of the volume to be non-overlapping on the simulated LFM sensor, while keeping computational effort within the capacity of a 20-CPU-core, quad-GPU workstation. Poissonian spike trains of action potentials were randomly generated (mean firing rate 0.5 Hz, 1000 time steps at a 5 Hz sampling rate), linearly mixed to introduce some correlation among them (mixing matrix chosen to result in an exponential distribution of variances explained by principal components), and convolved with an exponentially decaying GECI response kernel (mean decay time constant 1.2 s). Gaussian noise was added to the resulting traces to emulate a GECI signal-to-noise ratio (SNR) of 25.

The randomly placed neurons and the simulated GECI activity traces were then combined to generate a time series of volumes. To account for fluctuations of the background fluorescence due to neuropil and detection noise, a noisy background was added throughout the synthetic volumes (SNR 25), as well as to the final simulated sensor image. To obtain simulated sensor data in the absence of scattering, the synthetic volumes were convolved with a numerically simulated, ballistic LFM PSF (corresponding to a 16×0.8 NA water dipping objective). To obtain an approximation of the scattered sensor data, the synthetic volumes were convolved with a simulated scattered PSF obtained from a Monte-Carlo approach for a scattering length of 100 µm, a depth 400 µm, and a Henyey-Greenstein anisotropy parameter 0.9, in accordance with literature values[7,8].

Monte-Carlo Simulation of Scattered PSF

To generate the scattered PSFs, a Monte-Carlo approach was followed using 100000 virtual rays launched from a point source on the optical axis and propagated by sampling the distances between scattering events (free paths) from an exponential distribution and scattering angles from a Henyey-Greenstein distribution. For each scattering event, a "virtual" source was placed at the apparent origin of the scattered ray and at a depth corresponding to the free path before the scattering event. The resulting volume of virtual sources was projected forward to the sensor by convolving with the ballistic PSF. This was repeated for every lateral and axial displacement necessary to fully capture the spatially varying, but periodic structure of the LFM PSF.

Statistical Analysis of SID-Extracted Neuronal Signals

To obtain the extraction quality characterizations, a set of single-plane, simultaneous 2PM-SID movies were recorded at a series of depths from the posterior parietal cortex of awake, head-fixed mice (100-375 µm, total n=18 recordings, 4 animals).

Signal Extraction and Tuning of Detection Characteristics

The constrained matrix factorization algorithm for $Ca^{2+}$ signal extraction 5 implemented in the CaImAn analysis package was used to analyze the 2PM recordings, exactly implemented in the demo script[6] that comes with the package, thereby adapting the neuron size and approximate number of active neurons to values suitable for the data. After running an initialization subroutine and the core constrained matrix factorization, the script performs post-selection of ROIs based on spatial shape and size. It was found that the overall sensitivity and precision of the algorithm depends mostly on the thresholds for required convexity and size of neurons, as well as the approximate number of active neurons chosen initially. It was determined that three sets of parameter values for the data that result in three estimation qualities: a "sensitive" estimate (avoid missing neurons while accepting a greater risk of detecting false positives), a "conservative" estimate (avoid false positives while taking greater risk of missing actual neurons), and a "balanced" setting that aims for the optimal trade-off between sensitivity and precision.

The light-field raw data was processed. After background-subtraction, the motion metric was calculated, and motion-affected frames excluded from further processing. The sensitivity and precision values of SID are tuned by varying two parameters that estimate the noise floor and the background level, respectively, of the data and manually inspecting the output of the segmentation step. Sensitivity can be increased at the expense of precision by the lowering noise floor and background estimates, and vice versa. Again, three different sets of parameters were chosen that resulted in conservative, balanced and sensitive signal extraction qualities. SID was run with the "balanced" setting on all datasets and, in addition, with the "conservative" and "hypersensitive" settings on the recordings from one animal.

Compilation of Ground Truth and Categorization of Detections

The output of the sensitive CaImAn runs were manually inspected and the detections contained therein were categorized as true or false positives by assessing the shape of the detected object, and whether a single object was segmented into several ROIs. Any neurons that were not picked up were added manually and categorized as false negatives. Together, the true positive CaImAn detections and manually added neurons (positions and signals) in the 2PM recordings constitute what was regarded as the ground truth for all further analyses.

In a second manual step, all SID runs of the "sensitive" quality setting were assessed by comparing SID-detected locations to the ground truth locations, identifying the matching pairs, and adding any missing neurons, marking them as false negatives. The categorizations as true/false positives/negatives of all other CaImAn and SID results (i.e., the "balanced" and "conservative" extraction qualities) were inferred by automatic comparison to the locations and signals that were categorized manually based on the "sensitive" extraction output, followed by manual inspection and verification.

Neuron Detection Scores

To describe the neuron detection performance of the CaImAn and SID, three standard quality scores commonly used in the context of classification/detection models were computed: The score known as recall or sensitivity (ratio of true neurons to detected neurons); the precision (ratio of true positives to total detections, i.e. to the sum of true and false positives); and the F-score, which is defined as the harmonic mean of precision and recall (multiplied by two to scale its value to the (0,1) range). The F-score is one when both sensitivity and precision are equal to one, that is, all true neurons were detected correctly, and no false positives detections appeared.

These three scores for both SID and CaImAn, and the three extraction quality settings, were plotted. While the "sensitive" quality setting maximizes the sensitivity scores in both SID and CaImAn, the "conservative" setting results in maximal precision scores. The F-scores are optimized for the "balanced" setting. This result verifies that the parameter sets were chosen in an appropriate way, and it was determined that the "balanced" SID setting to be the default setting in the SID implementation.

Correlation Analysis of SID-Extracted Neuronal Signals

For the signal quality assessments presented in FIG. 3b, the zero-lag correlation coefficients of the true positive SID signals and their respective counterparts in the ground truth were computed, including their entire duration. The values given in FIG. 3b, therefore, contain information both about whether any peaks in the extracted signals match with the ground truth peaks (true/false positive GECI transient detections), and on whether their absence in the extracted signal is correct (true/false negative transient detections). For comparison, also calculated was the correlation of the SID signals to ground truth across peaks only. A histogram of the resulting peak-gated signal correlations versus depth was made. In comparison with the ungated data shown in FIGS. 3b-i, no significant differences were observed. This is an indication that any mismatches in the extracted signals compared to ground truth are not strongly biased towards false negative or false positive peaks, and that the ungated correlation values used throughout FIG. 3b are a good measure of signal extraction quality.

Neuropil Rejection

Generally, it can be desirable to decontaminate the neuronal signals from that of nearby neurites, as well as from any background signals (neuropil). In the disclosed embodiments, diffuse fluorescence from neuropil and very small neurites are rejected to a large degree due to background subtraction and the use of a standard deviation image as the starting point for segmentation but also the remainder of the algorithm. A planar movie from mouse cortex recorded simultaneously in LFM and 2PM was made. While the signal-to-background ratio is as low as ~2 in the mean image of a 2PM planar movie recorded depth 200 μm, it is as high as ~20 in the standard deviation image of the same movie. In the latter, diffuse background is strongly suppressed compared to the active cell bodies and larger neurites. The high-intensity regions of the 2PM standard deviation image, which clearly are somata, also stand out in the corresponding reconstructed standard deviation image of the LFM recording and reliably get identified by a local maximum search algorithm followed by a segmentation. This algorithm primarily picks out the active somata, but also some of the larger and very active neurites. These larger neurites are processed further, and their spatial and temporal components are optimized iteratively as described above. After the optimization, the optimized spatial components can be reconstructed to more closely examine their shape. While the cell bodies are compact, larger and spherically shaped, neurites often extend over a larger region, both due to their morphology and since nearby neurites are often merged into the same spatial component due to their correlated activity, and have less regular shapes. These differences are used for manual or automated post-selection processing whereby the signals from neurites can be identified and subtracted out from that of neuronal cell bodies.

Motion Detection and Correction

During imaging sessions, mice were head-fixed using a customized mount complemented with a head bar holder and a mouse body stabilizer (body jacket) and could run freely on a disc (200 mm diameter), as described in more detail elsewhere[12]. This considerably reduced animal-induced motion of the brain during imaging. To detect any residual motion in the raw SID/LFM raw data prior to further processing, a simple motion detection metric based on image autocorrelation was developed, which is computed as follows. First, the raw data is background-subtracted by rank-1 non-negative matrix factorization of the time series of SID/LFM camera frames. Next, the difference frames between all background-subtracted frames are computed, and the autocorrelation images of the difference frames are computed. In the difference frames, translation of a source within the FOV manifests itself as negative values at pixels illuminated from the previous source position, and positive values at pixels illuminated by the new source position. Hence, the values of these two sets of pixels will be anti-correlated, resulting in a negative peak in the autocorrelation image, at a spatial "lag" (distance) corresponding to the extent of the motion effect. The minima of each autocorrelation image (normalized to the maximum of the autocorrelation image) were extracted, and the time derivative of this series of minima was taken to obtain a clear metric for motion in the LFM raw frames. This metric was plotted for data from a simultaneous 2PM+SID recording. The motion metric computed from the of the 2PM and LFM/SID raw data are in good agreement, and the peaks in both metrics correlate with the onset of animal motion as recorded by tracking the movement of the running disc with a high-resolution optical computer mouse.

In SID/LFM, the point-spread function of the system is engineered to vary spatially (in order to provide axial resolution), so a translation of a source does not result in a mere translation of the image on the sensor as in classical wide-field imaging, but a more intricate transformation. However, it was found that simply taking the minima of the difference frame autocorrelation images still picks up motion well.

Pixels affected by motion would exhibit high standard deviation along time that does not originate from neuronal activity, and would thus negatively affect the precision of SID demixing and segmentation. Therefore, frames with a motion metric value above a threshold were excluded prior to computing the standard deviation image (step ii in FIG. 1).

Neural activity from the motion-affected frames was not recovered. Since LFM/SID captures the full recording volumes in an unbiased way, it was expected to be possible to recover neuron activity information by registering the SID-detected neuron footprints of the unaffected frames to the transformed footprints in the motion-affected frames and extract the source brightness. As mentioned above, the translation of a source (neuron) in LFM/SID results in transformation of its LFM image that is not a simple translation, due to the spatially varying point-spread function in LFM. However, since the point-spread function is known, it is possible to map source positions to images and iteratively find the transformation of source positions that best explains the image observed during motion frames. This procedure can be based on a standard optimizer for image registration, with the additional step of mapping position estimates to LFM images by convolving with the LFM point-spread function.

Optical Alignment of MiniLFM

For the conversion of a conventional widefield Miniscope to a MiniLFM, a microlens array was introduced in the optical path at the image plane, and exactly one focal length away from the CMOS imaging sensor. In one example, the microlens array has a focal length of 780 μm and measured 13×13 mm with a lenslet pitch of 100 μm (RPC Photonics MLA-S-100-f8). To be able to position it at a distance of 780 μm from the active surface of the image sensor, the sensor cover glass was removed by charring the glue that holds it in place using a hot air soldering rework station.

To accurately position the CMOS imaging sensor (1280× 1024 pixels, 5.2 μm pixel size; ON Semiconductor, USA) in the back focal plane of the microlens array, custom-made holders were employed for both elements. In combination with a three-axis translation stage and high-precision kinematic mounts (Thorlabs Inc., USA), the setup allowed for translation, rotation and tilt in six degrees of freedom at micrometer precision. An expanded, collimated green laser beam (532 nm) was directed at normal incidence onto the MLA, and the relative position of MLA and sensor adjusted until the sensor image showed optimal and uniform focal spots behind each microlens.

In an iterative process, the focal spots were analyzed using an ImageJ macro (Supplementary Software), and alignment was adjusted accordingly. MLA rotation was diagnosed simply by plotting line profiles across the frame; tilt and translation were quantified via particle analysis. The area of the individual focused laser spots in pixels, and the mean intensity per spot, were plotted in real time to visualize focal position and tilt in a color-coded way for all 3600 spots across the FOV (Supplementary Software). A homogeneous distribution of peak focal spot intensity across the frame indicates absence of tilt. Further, the area of the laser spots is smallest when the sensor is placed in the focal plane of the microlens array. Additionally, individual spots of the well-aligned system across the FOV were examined for size, intensity and symmetry.

The results from particle analysis were thus used to determine the precise position of the elements at which a simultaneous minimum of focal spot area and a maximum of mean intensity was reached. Once this configuration was obtained, the components were permanently glued to each other with high viscosity UV-curing adhesive (NOA63, Norland, USA) under a stereomicroscope.

To achieve a well-defined magnification and object-space working distance in spite of variations in the spacing of GRIN objective and tube lens, the microscope was adjusted to operate in "infinity" configuration. In a non-LFM microscope, this means that the image sensor is placed in the back focal plane of the tube lens. In an LFM, this translates to the MLA being placed in the back focal plane of the tube lens (and the sensor in the back focal plane of the MLA, as guaranteed by the alignment procedure described above). To find the "infinity" configuration, a collimated green laser is aimed through an iris and into the bottom opening of the MiniLFM, without the GRIN objective in place. The laser passes through the filters, gets focused by the tube lens, and a fraction of its intensity is reflected from the surface of the MLA and propagates back through the previous elements. Now, the distance of the MLA from the tube lens is adjusted until the back-reflection of the laser from the surface of the MLA emerging from the bottom opening of the MiniLFM is collimated. This is the case only if the reflecting surface (the MLA) is located in the back focal plane of the tube lens.

Miniature Head-Mounted Light-Field Microscope.

The MiniLFM design is based on the open source Miniscope project$_{23,4}$: Blue light from an LED is collimated by a ball lens, passed through an excitation filter (Chroma ET470/40x), and reflected off a dichroic mirror (Chroma T4951pxr). A GRIN lens (Edmund 64-520, 0.5NA, 0.23 pitch, diameter 1.8 mm, length 3.93 mm, working distance at 530 nm: approx. 200 µm) is implanted surgically such that its focal plane coincides with the axial center of the sample region of interest (see below for surgical procedures). Excitation light passes through the GRIN lens, which also collects fluorescence light. Fluorescence then passes through the dichroic mirror, an emission filter (Chroma ET525/50m), and an achromatic doublet tube lens (Edmund 45-207, f=15 mm) that forms an 8.93-fold magnified image of the GRIN front focal plane. An MLA (RPC Photonics MLA-S-100-f8, f=780 µm, microlens pitch 100 µm, square pattern, no gaps, diced to 13×13 mm, 2 mm substrate thickness) is placed in this image plane, and the image sensor (On Semiconductor MT9M001C12STM, 1.3 Mpx, 5.2 µm pixel size, rolling shutter) in the focal plane of the MLA. To accommodate the microlens array, the part holding the image sensor was elongated by 2.7 mm compared to the Miniscope design. The MLA and sensor are aligned w.r.t. each other using a custom alignment rig and glued together using UV-curing glue. To guarantee a known magnification, the distance of the GRIN and tube lenses is fixed such that the two lenses are placed at the sum of their focal lengths. Readout electronics, firmware and software do not differ from those published by the Miniscope project. The full frame readout time of the sensor chip is 50 ms, which is short compared to the GCaMP6f rise time (200 ms); the effects of the rolling shutter readout pattern on neuron timing extraction therefore are negligible. It is noted that overall miniscope weight can be reduced in the future by using a custom MLA with a thinner glass substrate (0.2 mm available from same manufacturer). This would reduce overall weight by ~15%. To improve stability of the MiniLFM relative to the baseplate, one facet of the MiniLFM body base was reinforced with a thin 1×1.5 mm aluminum plate to allow for more rigid fixation to the baseplate with a setscrew. Stability can be improved further by using removable adhesives (such as silicone elastomers, the weight of which is negligible) to connect the body to the baseplate.

Signal Extraction and Data Analysis.

Raw data was processed using a pipeline based on the recently established SID algorithm 4, which is briefly outlined in the following: After rank-1 matrix factorization for background subtraction, a motion metric based on the value range of the difference frames is calculated. The time series of raw frames is split at all time points where the motion metric exceeds a threshold, and the resulting low-motion segments are processed separately using the SID algorithm. For each of the segments, the standard deviation image is calculated, reconstructed by constrained deconvolution with a simulated PSF of the system, and segmented using a local maximum search. The resulting neuron candidate locations are used to seed a dictionary of spatial footprint templates that are iteratively updated using a constrained spatio-temporal matrix factorization algorithm that alternatingly updates the temporal (spatial) components, while keeping the spatial (temporal) components fixed. This results in a set of neuron footprints (i.e., the set of images of each neuron on the LFM sensor) and temporal signals. The neuron footprints are reconstructed individually by deconvolution with the aforementioned simulated LFM PSF of the optical system. These reconstructed, volumetric images of each neuron are checked for spatial compactness and compatibility with an expected neuron size. Subsequently, the neuron footprints and temporal signals from all the low-motion segments are pooled (merging neurons with strongly overlapping footprints). The temporal signals at this stage may still exhibit short glitches due to weaker motion events. These glitches exhibit sudden rises or drops in neuron brightness, lasting approx. 1-10 frames, and synchronized across most signals. These motion glitches were detected using the motion metric mentioned above (with optional manual additions) and interpolate the signals across the glitches by learning a model of GECI response dynamics$_{31,4}$ on each neuron and using it to interpolate across the motion-affected frames. The same GECI response model also yields the estimate of underlying firing rate. Since the model does not take into account a calibration of relative fluorescence change to underlying action potentials, the resulting calcium concentration and firing rate estimates are quoted in arbitrary units.

Simultaneous Two-Photon Microscopy and MiniLFM Recordings

In order to verify MiniLFM/SID results by comparison with simultaneously acquired two-photon microscopy data, awake mice (expressing GCaMP6f in hippocampus CA1, with implanted GRIN lens, and with a metal headbar and MiniLFM baseplate attached to the skull; see below for animal procedures) were mounted head-fixed but free to walk on a circular treadmill assembly$_{11,4}$ that allowed for precise positioning and alignment of the mouse head. A modified MiniLFM device was interfaced with a commercial upright two-photon microscope (2PM; Scientifica Slicescope with Coherent Chameleon Ultra II laser tuned to 920 nm, Olympus PlanApo N 1.25×/0.04 objective). The MiniLFM body was cut at the location of the fluorescence emission path, and a beam splitter (Thorlabs BST10R), which transmits 2P excitation light and reflects 70% of the GCaMP emission, was incorporated at that location, mounted at a 45-degree angle w.r.t. to the optical axis. The reflected GCaMP emission was passed through two infrared blocking filters (Thorlabs GFS900-A and Semrock Brightline 720SP) to remove 2P excitation light, and directed onto an unmodified MiniLFM detection module, consisting of a microlens array aligned and glued to a CMOS sensor, as described above. Transmitted GCaMP emission was directed into the 2PM objective and detected on a photo-multiplier-tube in the Slicescope non-descanned detection arm. MiniLFM frame rate was set to 2 Hz, and the 2PM acquisition trigger synchronized to the MiniLFM frame clock. The 2PM was set to acquire and average 9 frames for each MiniLFM frame to maximize fluorescence excitation.

A total of n=5 recordings was acquired from two mice, lasting 180 s each. The MiniLFM data was processed using the SID algorithm, as described above. The 2PM data was passed through the CaImAn algorithm$_{31,4}$ to detect active neurons and extract their signals. CaImAn output was inspected manually and corrected for false positive and false negative detections to establish a human-verified ground truth. The SID detected neurons were then compared to the ground truth and classified as true/false positives/negatives, and correlations between paired SID & ground-truth temporal signals were calculated. In addition, excess mutual information was calculated as the difference between the mutual information figure for each possible pair of ground truth neuronal activity traces, and the corresponding pairs of SID activity traces.

Quantification of Animal Agility

Mice were trained (for five consecutive days) to run back and forth on an elevated linear track (37 cm above ground, 198 cm long, wall height 2 cm) for water rewards offered in "base" areas at either end of the track. After training was completed, mouse behavior was recorded using an overhead camera (HD webcam C615, Logitech) for each of the three conditions (no device mounted, with Miniscope, with MiniLFM). One trial lasted 10 minutes, three trials were carried out per day for each of the three mice (one trial for each condition, in permuted order) with inter-trial resting periods of one hour. Trials were repeated for three consecutive days, resulting in a total of n=27 trials. Videos were analyzed by manually evaluating the number of times the animals would traverse the track and counting the number of stops. Speed was calculated by measuring the distance travelled along the track using a screen ruler, and dividing this value by the time required for the transversal (not including stops).

Quantification of Acceleration Due to Motion and Motion Artefacts

To measure the acceleration experienced by the MiniLFM head-mounted device, a circuit board containing a three-axis MEMS accelerometer chip (Sparkfun ADXL335, range ±3 g, 10 bits per axis, 50 Hz bandwidth) was attached to the back of the MiniLFM sensor circuit board. It was connected via five thin wires to an Arduino microcontroller, which read out the raw acceleration values and transferred them to a PC. The raw values were high-pass filtered to remove the effects of gravity and binned to match the MiniLFM frame rate.

Motion artefacts in widefield Miniscope recordings were quantified by applying the recursive, FFT-based rigid image registration algorithm published as part of the Miniscope data analysis package at https://github.com/daharoni/Miniscope_Analysis.

Experimental Model and Subject Details

All procedures were in accordance with the Institutional Animal Care and Use Committee (IACUC) at The Rockefeller University, New York. Mice were obtained from The Jackson Laboratory (C57BL/6J) and typically group-housed with a 12 h/12 h light cycle in standard cages, with food and water ab libitum.

Animal Surgery and In-Vivo Ca$^{2+}$ Imaging of Freely Moving Mice

Adult (P90+) male and female C57Bl/6J wild-type mice (n=5) were anesthetized with isoflurane (1-1.5%, flow rate 0.5-0.7 l/min) and placed in a stereotactic frame (RWD Life Science Co., Ltd., China). 250 nl of AAV1.Syn.GCaMP6f.WPRE.SV40 (titer ~10$^{12}$ viral particles/ml, AV-1-PV2822 Penn Vector Core) was injected in the posterior hippocampus, coordinates 2.1 mm posterior to bregma, 2 mm lateral and −1.65 mm dorsoventral from the top of the skull. Nucleus-localized AAV9.Syn.H2B.GCaMP6f.WPRE.Pzac2.1 was injected at the same titer. Injections were made with a microinjection controller (World Precision Instruments, FL) using glass pipettes previously pulled and beveled, filled with mineral oil. One week after injection, the GRIN lens implantation surgery was made. After removing the scalp and clearing the skull of connective tissues, a custom-made lightweight metal headbar was fixed onto the skull with cyanoacrylate adhesive (Krazy Glue) and covered with black dental cement (Ortho-Jet, Lang Dental, USA). The outline of the craniotomy was made using the injection site as a reference. From the injection site, the midpoint of the craniotomy was set 0.5 mm closer to bregma. After removing the skull, the cortex was aspirated with abundant cold saline solution until the corpus callosum became visible, and the horizontal striations were carefully removed until vertical striations became visible. When the entire area was clean and the bleeding had stopped, the GRIN lens was slowly inserted, to a depth of 1.35 mm from the top of the skull and glued in place using Vetbond (3M). When dry, the rest of the skull was covered with black dental cement. To prevent post-surgical infections and post-surgical pain, mice were fed pellets with antibiotic supplement (trimethoprim and sulfamethoxazole, Purina Mod 5053, LabDiet, MO) for 2 weeks and 1 mg/ml meloxicam i.p. injections (Putney, UK) for 3 to 5 days. Two weeks after the last surgery, the mice were anesthetized and placed in the stereotactic frame again, for affixing the baseplate of the miniature microscope. To this end, the baseplate is attached to the MiniLFM and the alignment of the baseplate orientation is adjusted manually until the illuminated FOV is centered on the image sensor, and the bright circles formed from diffuse illumination by the microlens array on the sensor appear symmetrical w.r.t. the center of the FOV. The baseplate is then glued in place using dental cement and Krazy Glue. The MiniLFM is removed as soon as the dental cement has hardened, and the animal returned to its home cage. After this, the animal is ready for imaging.

Imaging was done in experimental sessions lasting no longer than one hour. The MiniLFM was snapped onto the affixed baseplate, where it gets held in place by small magnets embedded in the baseplate as well as the bottom face of the MiniLFM, and additionally locked by a setscrew. The mice were placed into an open field arena or into a linear track where they walked freely during the recording session.

A total of 12 neuronal recordings from 5 animals were analyzed (including simultaneous 2PM-MiniLFM verification recordings). Animals were included in the study for which all preparatory animal procedures worked sufficiently well to allow for signal detection. Provided that animal procedures (surgeries and viral injections/GECI expression) were successful as verified using a standard two-photon microscope, imaging results and data quality were found to be reliably reproducible, both across imaging sessions with the same animal, and across animals. Since the object of this study is to establish a neural recording method rather than any biological findings, this sample size is sufficient to verify the performance of the disclosed method.

Only animals were included in the study for which all preparatory animal procedures worked sufficiently well to allow for signal detection (i.e., GECI expression observable, implanted GRIN lens placement correct), as verified using a standard two-photon microscope. Of these animals, none were excluded.

For all animals in which animal procedures (surgeries and viral injections/GECI expression) were successful (as verified using a standard two-photon microscope), imaging and data analysis results were reliably reproduced, both across imaging sessions with the same animal, and across animals.

Software and Computing Systems

Custom code for the MiniLFM alignment and Data analysis pipeline was developed. Custom-written Java (ImageJ/Fiji, release 2017 May 30) and R (v3.x) code implementing focal spot analysis for LFM alignment, as well as Matlab (2017a) code implementing the signal extraction and motion detection pipeline, as described in the Main Text and Online Methods were also developed. The SID Matlab package published as Supplementary Software with a prior publication Nöbauer, T. et al. Video rate volumetric $Ca^{2+}$ imaging across cortex using seeded iterative demixing (SID) microscopy. Nat Meth 14, 811-818 (2017), doi:10.1038/nmeth.4341, is required, as well as the dependencies listed in the README.txt file accompanying that package.

Figure 4:
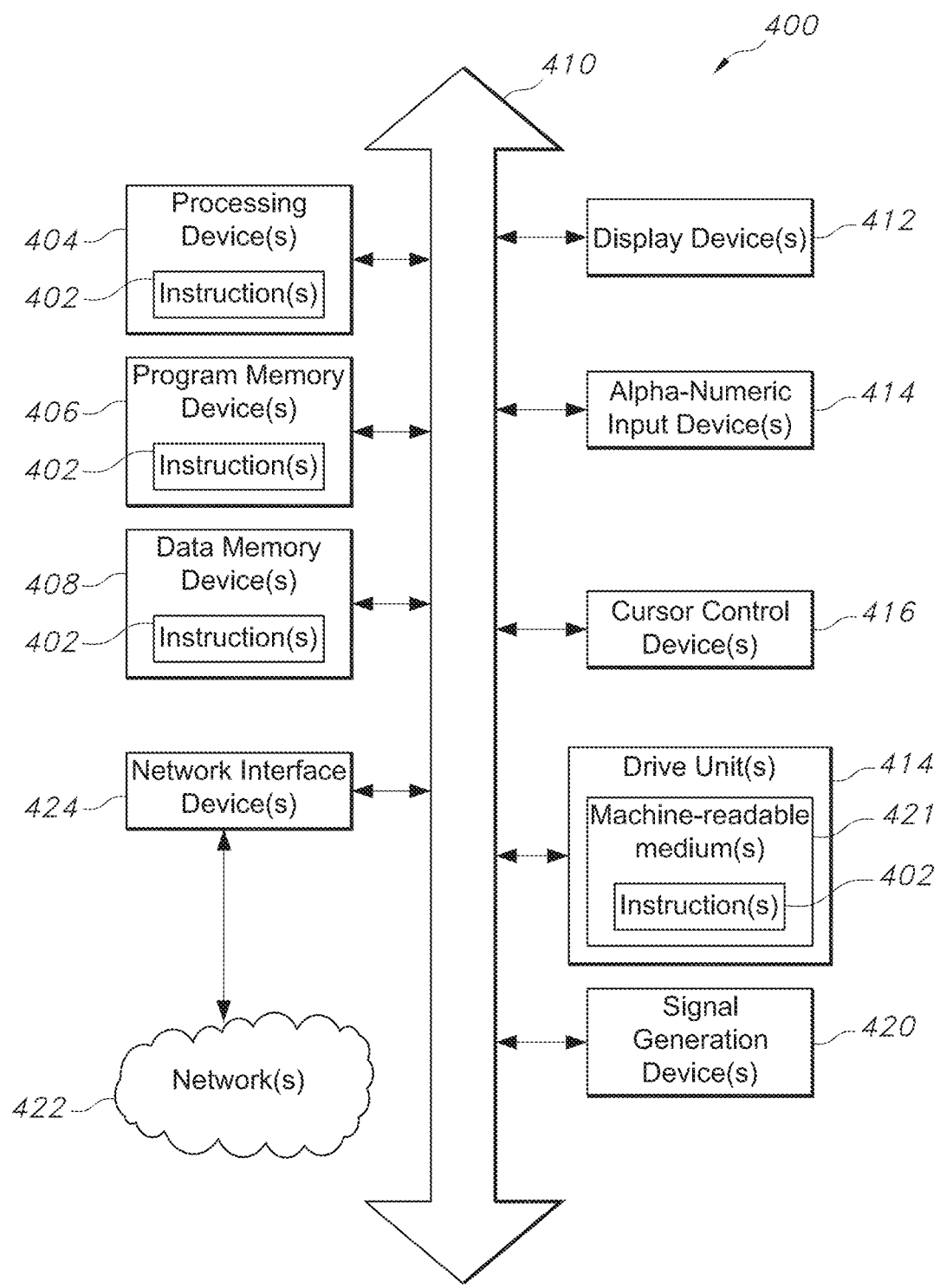
FIG. 4 is a block diagram of at least a portion of an exemplary machine in the form of a computing system that performs methods according to one or more embodiments disclosed herein.

One or more embodiments disclosed herein, or a portion thereof, may make use of software running on a computer or workstation. By way of example, only and without limitation, FIG. 4 is a block diagram of an embodiment of a machine in the form of a computing system 400, within which is a set of instructions 402 that, when executed, cause the machine to perform any one or more of the methodologies according to embodiments of the disclosed subject matter. In one or more embodiments, the machine operates as a standalone device; in one or more other embodiments, the machine is connected (e.g., via a network 422) to other machines. In a networked implementation, the machine operates in the capacity of a server or a client user machine in a server-client user network environment. Exemplary implementations of the machine as contemplated by embodiments of the disclosed subject matter include, but are not limited to, a server computer, client user computer, personal computer (PC), tablet PC, personal digital assistant (PDA), cellular telephone, mobile device, palmtop computer, laptop computer, desktop computer, communication device, personal trusted device, web appliance, network router, switch or bridge, or any machine capable of executing a set of instructions (sequential or otherwise) that specify actions to be taken by that machine.

The computing system 400 includes a processing device(s) 404 (e.g., a central processing unit (CPU), a graphics processing unit (GPU), or both), program memory device(s) 406, and data memory device(s) 408, which communicate with each other via a bus 410. The computing system 400 further includes display device(s) 412 (such as a liquid crystal display (LCD), flat panel, solid state display, or cathode ray tube (CRT)). The computing system 400 includes input device(s) 414 (e.g., a keyboard), cursor control device(s) 416 (e.g., a mouse), disk drive unit(s) 418, signal generation device(s) 420 (e.g., a speaker or remote control), and network interface device(s) 424, operatively coupled together, and/or with other functional blocks, via bus 410.

The disk drive unit(s) 418 includes machine-readable medium(s) 426, on which is stored one or more sets of instructions 402 (e.g., software) embodying any one or more of the methodologies or functions herein, including those methods illustrated herein. The instructions 402 may also reside, completely or at least partially, within the program memory device(s) 406, the data memory device(s) 408, and/or the processing device(s) 404 during execution thereof by the computing system 400. The program memory device(s) 406 and the processing device(s) 404 also constitute machine-readable media. Dedicated hardware implementations, such as but not limited to ASICs, programmable logic arrays, and other hardware devices can likewise be constructed to implement methods described herein. Applications that include the apparatus and systems of various embodiments broadly comprise a variety of electronic and computer systems. Some embodiments implement functions in two or more specific interconnected hardware modules or devices with related control and data signals communicated between and through the modules, or as portions of an ASIC. Thus, the example system is applicable to software, firmware, and/or hardware implementations.

The term "processing device" as used herein is intended to include any processor, such as, for example, one that includes a CPU (central processing unit) and/or other forms of processing circuitry. Further, the term "processing device" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the display device(s) 412, input device(s) 414, cursor control device(s) 416, signal generation device(s) 420, etc., can be collectively referred to as an "input/output interface," and is intended to include one or more mechanisms for inputting data to the processing device(s) 404, and one or more mechanisms for providing results associated with the processing device(s). Input/output or I/O devices (including but not limited to keyboards (e.g., alpha-numeric input device(s) 414, display device(s) 412, and the like) can be coupled to the system either directly (such as via bus 410) or through intervening input/output controllers (omitted for clarity).

In an integrated circuit implementation of one or more embodiments of the disclosed subject matter, multiple identical die are typically fabricated in a repeated pattern on a surface of a semiconductor wafer. Each such die may include a device described herein, and may include other structures and/or circuits. The individual dies are cut or diced from the wafer, then packaged as integrated circuits. One skilled in the art would know how to dice wafers and package die to produce integrated circuits. Any of the exemplary circuits or method illustrated in the accompanying figures, or portions thereof, may be part of an integrated circuit. Integrated circuits so manufactured are considered part of this disclosed subject matter.

An integrated circuit in accordance with the embodiments of the disclosed subject matter can be employed in essentially any application and/or electronic system in which buffers are utilized. Suitable systems for implementing one or more embodiments of the disclosed subject matter include, but are not limited to, personal computers, interface devices (e.g., interface networks, high-speed memory interfaces (e.g., DDR3, DDR4), etc.), data storage systems (e.g., RAID system), data servers, etc. Systems incorporating such integrated circuits are considered part of embodiments of the disclosed subject matter. Given the teachings provided herein, one of ordinary skill in the art will be able to contemplate other implementations and applications.

In accordance with various embodiments, the methods, functions or logic described herein is implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement the methods, functions or logic described herein.

The embodiment contemplates a machine-readable medium or computer-readable medium containing instructions 402, or that which receives and executes instructions 402 from a propagated signal so that a device connected to a network environment 422 can send or receive voice, video or data, and to communicate over the network 422 using the instructions 402. The instructions 402 are further transmitted or received over the network 422 via the network interface device(s) 424. The machine-readable medium also contains a data structure for storing data useful in providing a functional relationship between the data and a machine or computer in an illustrative embodiment of the systems and methods herein.

While the machine-readable medium 402 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the embodiment. The term "machine-readable medium" shall accordingly be taken to include, but not be limited to: solid-state memory (e.g., solid-state drive (SSD), flash memory, etc.); read-only memory (ROM), or other non-volatile memory; random access memory (RAM), or other re-writable (volatile) memory; magneto-optical or optical medium, such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

It should also be noted that software, which implements the methods, functions and/or logic herein, are optionally stored on a tangible storage medium, such as: a magnetic medium, such as a disk or tape; a magneto-optical or optical medium, such as a disk; or a solid state medium, such as a memory automobile or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

Although the specification describes components and functions implemented in the embodiments with reference to particular standards and protocols, the embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments are utilized and derived therefrom, such that structural and logical substitutions and changes are made without departing from the scope of this disclosure. Figures are also merely representational and are not drawn to scale. Certain proportions thereof are exaggerated, while others are decreased. Accordingly, the specification and drawings are to be regarded in an illustrative rather than a restrictive sense.

Such embodiments are referred to herein, individually and/or collectively, by the term "embodiment" merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus the following claims are hereby incorporated into the detailed description, with each claim standing on its own as a separate example embodiment.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings provided herein, one of ordinary skill in the art will be able to contemplate other implementations and applications of the techniques of the disclosed embodiments. Although illustrative embodiments have been described herein with reference to the accompanying drawings, it is to be understood that these embodiments are not limited to the disclosed embodiments, and that various other changes and modifications are made therein by one skilled in the art without departing from the scope of the appended claims.

REFERENCES

1. Chen et al., *Nature* 499, 295-300 (2013).
2. Schrödel et al., *Nat. Methods* 10, 1013-1020 (2013).
3. Nguyen et al., *Proc. Natl. Acad. Sci.* 113, E1074-E1081 (2016).
4. Prevedel et al., *Nat. Methods* 11, 727-730 (2014).
5. Ahrens et al., *Nat. Methods* 10, 413-420 (2013).
6. Denk et al., *Science* 248, 73-76 (1990).
7. Helmchen et al., *Nat. Methods* 2, 932-940 (2005).
8. Ji et al., *Nat. Neurosci.* 19, 1154-1164 (2016).
9. Grewe et al., *Nat. Methods* 7, 399-405 (2010).
10. Botcherby et al., *Proc. Natl. Acad. Sci.* 109, 2919-2924 (2012).
11. Kirkby et al., *Opt. Express* 18, 13720 (2010).
12. Cheng et al., *Nat. Methods* 8, 139-142 (2011).
13. Kim et al., *Opt. Express* 15, 11658 (2007).
14. Stirman et al., *Wide field-of-view, twin region two photon imaging across extended cortical networks.* (2014). at http://biorxiv.org/lookup/doi/10.1101/011320
15. Reddy et al., *Nat. Neurosci.* 11, 713-720 (2008).
16. Katona et al., *Nat. Methods* 9, 201-208 (2012).
17. Fernández-Alfonso et al., *J. Neurosci. Methods* 222, 69-81 (2014).
18. Prevedel et al., *Nat. Methods* advance online publication, (2016).
19. Huisken, J. *Science* 305, 1007-1009 (2004).
20. Wu, et al., *Proc. Natl. Acad. Sci.* 108, 17708-17713 (2011).
21. Chhetri et al., *Nat. Methods* 12, 1171-1178 (2015).
22. Bouchard et al., *Nat. Photonics* 9, 113-119 (2015).
23. Yang, et al, *Neuron* 89, 269-284 (2016).
24. Abrahamsson et al., *Nat. Methods* 10, 60-63 (2012).
25. Packer et al., *Nat. Methods* 12, 140-146 (2015).
26. Levoy et al., *ACM Trans. Graph.* 25, 924 (2006).
27. Broxton et al., *Opt. Express* 21, 25418-25439 (2013).
28. Cohen et al., *Opt. Express* 22, 24817-24839 (2014).
29. Pégard et al., *Optica* 3, 517 (2016).
30. Liu et al., *Opt. Express* 23, 14461 (2015).
31. Kaifosh et al., *Front. Neuroinformatics* 8, 80 (2014).
32. Pachitariu et al., Extracting regions of interest from biological images with convolutional sparse block coding. in *Adv. Neural Inf. Process. Syst.* 1745-1753 (2013). at <http://papers.nips.cc/paper/5167-extracting-regions-of-interest-from-biological-imageswith-convolutional-sparse>
33. Mukamel et al., *Neuron* 63, 747-760 (2009).
34. Pnevmatikakis et al., *Neuron* (2016). at http://www.sciencedirect.com/science/article/pii/S0896627315010843
35. Maruyama et al., *Neural Netw. Off. J. Int. Neural Netw. Soc.* 55, 11-19 (2014).
36. Haeffele et al., Structured Low-Rank Matrix Factorization: Optimality, Algorithm, and Applications to Image Processing. in *Proc. 31st Int. Conf. Mach. Learn.* 32, (JMLR, 2014).
37. Diego Andilla, F. & Hamprecht, F. A. in *Adv. Neural Inf. Process. Syst.* 27 (eds. Ghahramani, Z., Welling, M., Cortes, C., Lawrence, N. D. & Weinberger, K. Q.) 64-72 (Curran Associates, Inc., 2014). at <http://papers.nips.cc/paper/5342-sparse-space-timedeconvolution-for-calcium-image-analysis.pdf
38. Nairat et al., Approach for incorporating aerosol scattering in wave optics propagation simulation in 2013 *IEEE Aerosp. Conf.* 1-5 (2013) doi:10.1109/AERO.2013.6497321
39. Jacques, S. L., *Phys. Med. Biol.* 58, R37 (2013).
40. Dombeck et al., *Nat. Neurosci.* 13, 1433-1440 (2010).
41. Kaifosh et al., *Nat. Neurosci.* 16, 1182-1184 (2013).
42. Graves et al., *Neuron* 76, 776-789 (2012).
43. Waller et al., *Nature* 523, 416-417 (2015).
44. Zhou et al., Efficient and accurate extraction of in vivo calcium signals from microendoscopic video data. in (2015). at https://www.semanticscholar.org/paper/Efficient-and-accurate-extraction-of-in-vivo-Zhou-Resendez/e57db51b5518da58ae734ff58014f3a862b30b0e
45. Apthorpe et al., Automatic Neuron Detection in Calcium Imaging Data Using Convolutional Networks. *ArXiv*160607372 Cs Q-Bio (2016). at http://arxiv.org/abs/1606.07372
46. Wang et al., *Nat. Commun.* 6, (2015).
1A. Ji et al., *Nat. Neurosci.* 19, 1154-1164 (2016).
2A. Yang et al., *Nat. Methods* 14, 349-359 (2017).
3A. Prevedel et al., *Nat. Methods* 11, 727-730 (2014).
4A. Nöbauer et al., *Nat. Methods* 14, 811-818 (2017).
5A. Pégard et al., *Optica* 3, 517 (2016).
6A. Huisken et al., *Science* 305, 1007-1009 (2004).
7A. Ahrens et al., *Nat. Methods* 10, 413-420 (2013).
8A. Chhetri et al., *Nat. Methods* 12, 1171-1178 (2015).
9A. Bouchard et al., *Nat. Photonics* 9, 113-119 (2015).
10A. Schrodel et al., *Nat. Methods* 10, 1013-1020 (2013).
11A. Prevedel et al., *Nat. Methods* 13, 1021-1028 (2016).
12A. Duemani Reddy et al., *Nat. Neurosci.* 11, 713-720 (2008).
13A. Yang et al., *Neuron* 89, 269-284 (2016).
14A. Katona et al., *Nat. Methods* 9, 201-208 (2012).
15A. Fernández-Alfonso, et al., *J. Neurosci. Methods* 222, 69-81 (2014).
16A. Botcherby et al., *Proc. Natl. Acad. Sci.* 109, 2919-2924 (2012).
17A. Lu, et al., *Nat. Neurosci.* 20, 620-628 (2017).
18A. Song, et al., *Nat. Methods* 14, 420-426 (2017).
19A. Chen et al., *Nature* 499, 295-300 (2013).
20A. Helmchen et al., *Neuron* 31, 903-912 (2001).
21A. Flusberg et al., *Nat. Methods* 5, 935-938 (2008).
22A. Ghosh, et al., *Nat. Methods* 8, 871-878 (2011).
23A. Cai et al., *Nature* 534, 115-118 (2016).
24A. Barbera, et al., *Neuron* 92, 202-213 (2016).
25A. Sabharwal et al., *Appl. Opt.* 38, 7133-7144 (1999).
26A. Jung et al., *J. Neurophysiol.* 92, 3121-3133 (2004).
27A. Flusberg et al., *Opt. Lett.* 30, 2272-2274 (2005).
28A. Ziv et al., *Nat. Neurosci.* 16, 264-266 (2013).
29A. Levoy, et al., *ACM Trans. Graph.* 25, 924 (2006).
30A. Broxton et al., *Opt. Express* 21, 25418-25439 (2013).
31A. Pnevmatikakis et al., *Neuron* 89, 285-299 (2016).
32A. Matz et al., *Opt. Express* 24, 10987-11001 (2016).

What is claimed is:

1. An imaging signal extraction apparatus comprising:
an imaging apparatus interface;
a processing device, the processing device operatively coupled to the imaging apparatus interface; and
a computer readable storage medium comprising instructions that, when executed by the processing device, cause the processing device to perform operations comprising:
obtaining imaging information from the imaging apparatus interface comprising a time series of camera frames;
generating a two-dimensional (2D) image from the imaging information comprising an estimated ballistic component of an emitted signal captured by the imaging apparatus interface;
remapping the 2D image to generate a three-dimensional (3D) image;
identifying a candidate object in the 3D image;
determining an estimated spatial forward model of the candidate object by mapping the 3D image of the candidate object with a point-spread-function associated with the imaging apparatus; and
generating demixed signal information by iteratively updating the estimated spatial forward model and estimated temporal components until convergence is reached for the candidate object.

2. The imaging signal extraction apparatus of claim 1, wherein the imaging signal extraction apparatus is a light-field microscope.

3. The imaging signal extraction apparatus of claim 1, wherein the computer readable storage medium includes instructions configured to cause the processing device to perform operation of generating the 2D image by determining a standard deviation of the time series of camera frames.

4. The imaging signal extraction apparatus of claim 1, wherein to remap the 2D image to generate the 3D image the computer readable storage medium includes instructions configured to cause the processing device to perform operation of mapping the 2D image to generate the 3D image by deconvolving the 2D image.

5. The imaging signal extraction apparatus of claim 4, wherein the computer readable storage medium includes instructions configured to cause the processing device to perform operation of deconvolving the 2D image using the point-spread-function associated with the imaging apparatus.

6. The imaging signal extraction apparatus of claim 4, wherein the computer readable storage medium includes instructions configured to cause the processing device to perform operation of prior to remapping the 2D image, thresholding the image to exclude residual background activity from the 2D image.

7. The imaging signal extraction apparatus of claim 4, wherein the computer readable storage medium includes instructions configured to cause the processing device to perform operation of reducing reconstruction artefacts by incorporating total-variation and sparsity constraints into the mapping.

8. The imaging signal extraction apparatus of claim 4, wherein to reduce reconstruction artefacts the computer readable storage medium includes instructions configured to cause the processing device to perform operation of reducing reconstruction artefacts by applying an equation $$x_{n+1} = x_n(P^T y / P y + \lambda 1_{dim(x)}),$$

wherein x represents a volume estimate, $1_{dim(x)}$ represents a vector of ones with a same dimension as x, P represents the point-spread-function, $\lambda$ represents weight of a sparsity-encouraging term, and y represents background subtracted raw data.

9. The imaging signal extraction apparatus of claim 1, wherein to determine the estimated spatial forward model of the candidate object the computer readable storage medium includes instructions configured to cause the processing device to perform operation of determining the estimated spatial forward model by convolving the 3D image of the candidate object with the point-spread-function associated with the imaging apparatus.

10. The imaging signal extraction apparatus of claim 1, wherein the computer readable storage medium includes instructions configured to cause the processing device to perform operation of obtaining background-corrected data by using the estimated spatial forward model of the candidate object and the estimated temporal components.

11. The imaging signal extraction apparatus of claim 1, wherein to obtain the imaging information from the imaging apparatus interface the computer readable storage medium includes instructions configured to cause the processing device to perform operations of:
obtaining background information representing background fluorescence information obtained from a light-field microscope; and
subtracting background information from the imaging information.

12. The imaging signal extraction apparatus of claim 11, wherein to subtract the background information from the imaging information the computer readable storage medium includes instructions configured to cause the processing device to perform operation of subtracting the background information from the imaging information by applying rank-1-matrix factorization.

13. The imaging signal extraction apparatus of claim 11, wherein to identify the candidate object in the 3D image the computer readable storage medium includes instructions configured to cause the processing device to perform operation of suppressing spatial frequencies incompatible with object shapes.

14. The imaging signal extraction apparatus of claim 13, wherein the computer readable storage medium includes instructions configured to cause the processing device to perform operations of:
applying a bandpass filter to the 3D image;
thresholding to exclude background artefacts; and
applying a local maximum search algorithm.

15. The imaging signal extraction apparatus of claim 11, wherein to determine the estimated spatial forward model of the candidate object by mapping the 3D image of the candidate object with the point-spread-function associated with the imaging apparatus the computer readable storage medium includes instructions configured to cause the processing device to perform operations of:
generating a sparse non-negative p×n matrix $S_i$,
wherein n is a number of object candidates, p is a number of pixels, and i is an iteration number, wherein $S_0$ is an initial spatial forward model of the candidate object.

16. The imaging signal extraction apparatus of claim 15, wherein the computer readable storage medium includes instructions configured to cause the processing device to perform operation of generating a p×t matrix Y using a matrix product of $S_0$ and $T_0$, wherein $T_i$ is a non-negative n×t matrix of temporal components, wherein t is a number of time steps in the imaging information.

17. The imaging signal extraction apparatus of claim 16, wherein $T_i$ is obtained by iteratively applying an adapted Richardson-Lucy-type solver with a sparsity constraint.

18. The imaging signal extraction apparatus of claim 17, wherein to iteratively update the estimated spatial forward model and estimated temporal components the computer readable storage medium includes instructions configured to cause the processing device to perform operations of:
   determining an updated estimated $S_i$, while keeping estimated $T_i$ constant;
   determining an updated estimated $T_i$, while keeping estimated $S_i$ constant; and
   iteratively repeating determining the updated estimated $S_i$ while keeping estimated $T_i$ constant until convergence is reached, for the object candidate.

19. The imaging signal extraction apparatus of claim 1, wherein the candidate object is a neuron.

20. An image signal extraction apparatus comprising:
   an imaging apparatus interface;
   a processing device, the processing device operatively coupled to the imaging apparatus interface; and
   a computer readable storage medium comprising instructions that, when executed by the processing device, perform operations comprising:
      obtaining imaging information from the imaging apparatus interface, the imaging information comprising a time series of camera frames;
      generating a two-dimensional (2D) image from the imaging information comprising a ballistic component of an emitted signal captured by the imaging apparatus interface;
      remapping the 2D image to generate a three-dimensional (3D) image;
      identifying a candidate object in the 3D image;
      determining an estimated spatial forward model of the candidate object by mapping the 3D image of the candidate object with a point-spread-function associated with the imaging apparatus; and
      generating demixed signal information by iteratively updating the estimated spatial forward model and estimated temporal components until convergence is reached for the candidate object,
   wherein the imaging apparatus interface comprises:
      hardware implemented using a Miniscope platform,
      an implanted endoscopic Gradient-Index (GRIN) relay,
      a sensor, and
      a microlens array, the microlens array being aligned and mounted such that a back focal plane of the microlens array and a sensor plane of the sensor coincide.

21. The image signal extraction apparatus of claim 20, wherein the microlens array is disposed in an optical path of an image plane, the microlens array being disposed one focal length away from the sensor.

22. The image signal extraction apparatus of claim 20, further comprising a holding member configured to hold the sensor, the holding member being elongated by 2.7 mm when compared with a Miniscope design.

23. A method of extracting imaging signals using an imaging apparatus interface operatively coupled to a processing device, the method comprising:
   obtaining imaging information from an imaging apparatus interface, the imaging information comprising a time series of camera frames;
   generating a two-dimensional (2D) image from the imaging information comprising an estimated ballistic component of an emitted signal captured by the imaging apparatus interface;
   remapping the 2D image to generate a three-dimensional (3D) image;
   identifying a candidate object in the 3D image;
   determining an estimated spatial forward model of the candidate object by mapping the 3D image of the candidate object with a point-spread-function associated with the imaging apparatus; and
   generating demixed signal information by iteratively updating the estimated spatial forward model and estimated temporal components until convergence is reached for the candidate object.

* * * * *